(12) United States Patent
Inoue

(10) Patent No.: US 6,874,159 B2
(45) Date of Patent: Mar. 29, 2005

(54) CARTRIDGE FOR CONTAINING RECORDING MEDIUM

(75) Inventor: Naoki Inoue, Kanagawa (JP)

(73) Assignee: Sony Corporation, Tokyo (JP)

( * ) Notice: Subject to any disclaimer, the term of this patent is extended or adjusted under 35 U.S.C. 154(b) by 75 days.

(21) Appl. No.: 10/250,460

(22) PCT Filed: Oct. 31, 2002

(86) PCT No.: PCT/JP02/11400

§ 371 (c)(1),
(2), (4) Date: Jul. 2, 2003

(87) PCT Pub. No.: WO03/041075

PCT Pub. Date: May 15, 2003

(65) Prior Publication Data

US 2004/0047191 A1 Mar. 11, 2004

(30) Foreign Application Priority Data

Nov. 5, 2001 (JP) .......................................... 2001-339968
Nov. 5, 2001 (JP) .......................................... 2001-339969

(51) Int. Cl.[7] .............................................. G11B 23/03
(52) U.S. Cl. ....................................... 720/728; 360/133
(58) Field of Search ........................ 720/728; 360/133; 369/291.1

(56) References Cited

U.S. PATENT DOCUMENTS 6,700,741 B2 * 3/2004 Inoue et al. ................. 360/133

FOREIGN PATENT DOCUMENTS

| JP | 11-250604 | | 9/1999 |
|---|---|---|---|
| JP | 2000-113630 | | 4/2000 |
| JP | 2000-260153 | | 9/2000 |
| JP | 2001-256752 | | 9/2001 |
| JP | 02003228944 A | * | 8/2003 |
| JP | 02003228945 A | * | 8/2003 |
| JP | 02003228947 A | * | 8/2003 |
| JP | 02003228948 A | * | 8/2003 |
| JP | 02003228949 A | * | 8/2003 |
| JP | 02003317421 A | * | 11/2003 |
| JP | 02004152444 A | * | 5/2004 |

* cited by examiner

Primary Examiner—Allen Cao
(74) Attorney, Agent, or Firm—Frommer Lawrence & Haug LLP; William S. Frommer

(57) ABSTRACT

A cartridge for encasing optical discs of different diameters and thus permitting to load bare optical discs of different diameters into a disc cartridge-dedicated recorder/player. It includes a cartridge body (2) formed from an upper shell (6) having formed therein an insertion/removal opening (2a) for a first optical disc (3a) and a lower shell (7) having a write/read opening (24) formed therein, the upper and lower shells (6, 7) being butted to each other, a middle shell (4) having formed in the main side thereof an opening (44) corresponding to the opening (24) and which is rotatably received in the cartridge body (2), and a pair of shutter members (5a, 5b) installed on the middle shell (4) at the side of the lower shell (7) and which uncovers the openings (24, 44) when the middle shell (4) rotates until the openings (24, 44) are aligned with each other. A disc receptacle (11a) is formed to have a disc holder (11b) in which the first optical disc (3a) is rotatably held and a disc holder (11c) in which a smaller-diameter second optical disc (3c) is rotatably held.

21 Claims, 33 Drawing Sheets

CARTRIDGE FOR CONTAINING RECORDING MEDIUM

TECHNICAL FIELD

The present invention relates to a cartridge for encasing any of discs of different diameters as information signal recording medium and permitting to load the recording medium encased therein into a disc recorder and/or player.

This application claims the priority of the Japanese Patent Application Nos. 2001-339968 and 2001-339969 both filed on Nov. 5, 2001, the entirety of which is incorporated by reference herein.

BACKGROUND ART

As a recording medium for information signal, there have widely been used optical discs to or from which information signal is optically written or read by a light beam. If an optical disc of this type has foreign matter such as dust, fingerprint or the like adherent to the signal recording surface thereof, missing of information signal will possibly be caused during recording or playback of the optical disc and thus the information signal cannot be recorded or reproduced accurately.

To prevent adhesion to the signal recording surface of such foreign matter like dust which will possibly cause such missing of the information signal, the optical disc is usually encased in a cartridge for use as a disc cartridge.

Generally, a disc cartridge is a cartridge having an optical disc pre-encased therein. The optical disc is rotatably held in the cartridge. The cartridge has formed therein a write/read opening through which a part of the optical disc held therein is exposed to outside. A write/read head faces the optical disc thus held in the cartridge through the write/read opening to write or read information signal to or from the optical disc. The write/read opening formed in the cartridge is covered with a pair of shutter members movably installed on the cartridge at least when the disc cartridge is not used, namely, when it is not loaded in any recorder and/or player.

By covering the write/read opening in the optical disc encasing cartridge with the pair of shutter members, it is possible to prevent dust or the like from entering the cartridge and adhering to the signal recording surface of the optical disc.

Optical discs used as information signal recording media include bare ones, namely, ones not encased in any cartridge, and loadable in a recorder and/or player for write or read of information signal thereto or therefrom.

However, for loading such a bare optical disc into a recorder and/or player dedicated for a disc cartridge, a cartridge is required to encase the optical disc therein for loading into such a disc cartridge-dedicated recorder and/or player.

In the meantime, the optical discs not encased in any cartridge or similar casing and loadable in a recorder and/or player include ones having information signal recorded therein in a common format but different in diameter from each other. Such optical discs include two types: one is of 12 cm in diameter (standard size) and the other is of a smaller diameter than the first one, 8 cm for example. For use of such optical discs not encased in any cartridge and different in diameter from each other for playing by a disc cartridge-dedicated recorder and/or player, cartridges may be prepared for loading into such a recorder and/or player to encase the optical discs of different diameters, respectively. Namely, each of the optical discs may be put in a corresponding one of the cartridges before loading into the recorder and/or player.

However, the preparation of such a cartridge for each of the optical discs of different diameters will add to the number of cartridge types, difficulty of cartridge management and also to the costs of manufacturing the cartridges.

DISCLOSURE OF THE INVENTION

Accordingly, the present invention has an object to overcome the above-mentioned drawbacks of the related art by providing a cartridge permitting to easily load a recording medium normally used, not encased in any cartridge or the like, into a recorder and/or player dedicated for a recording medium pre-encased in a cartridge.

The present invention has another object to provide a cartridge for selectively encasing either of first and second recording media of different diameters for loading into a recorder and/or player dedicated for a recording medium pre-encased in a cartridge.

The present invention has still another object to provide a cartridge capable of securely holding an information recording medium to be selectively loaded into a recorder and/or player.

The present invention has yet another object to provide a cartridge permitting to easily load, into a recorder and/or player designed for use with a first information recording medium of a standard size, a second information recording medium of a smaller diameter than the first information recording medium.

The present invention has still another object to provide a cartridge capable of positively protecting a recording medium once loaded in a recorder and/or player.

The present invention has yet still another object to provide a cartridge easy to assemble, which can encase a recording medium removably, and which can be manufactured through almost same production and assembling steps as for a cartridge having a recording medium pre-encased therein.

The above object can be attained by providing a cartridge for encasing either of a first recording medium and a second recording medium different in diameter from the first recording medium, the cartridge including according to the present invention, a cartridge body consisting of an upper shell and lower shell, butted to each other, the upper shell having formed in the main side thereof an insertion/removal opening somewhat larger than the first recording medium and through which the first and second recording media are to be inserted and/or removed and the lower shell having a first opening formed therein, a middle shell having the main side thereof exposed to outside through the insertion/removal opening in the upper shell of the cartridge body, defining together with the insertion/removal opening a recording medium receptacle which selectively receives the first and second recording media, having formed therein a second opening corresponding to the first opening in the lower shell of the cartridge body and which is rotatably received in the cartridge body, and a pair of shutter members installed to the middle shell at the side of the lower shell side and which uncovers the first and second openings when the middle shell rotates until the first and second openings are aligned with each other. The recording medium receptacle includes a first recording medium holder in which the first recording medium is rotatably held and a second recording medium holder in which the second recording medium is rotatably held, and the first and second recording medium holders are provided concentrically with each other. That is, the cartridge, having received therein a user's desired one of recording media different in diameter from each other through the insertion/removal opening, is loaded into a recorder and/or player. Since this cartridge is formed to have a similar construction including a pair of shutter members, except for the insertion/removal opening formed in the upper shell and recording medium holders formed on the middle shell for recording media of different diameters, to a cartridge having a recording medium pre-encased therein (will be referred to as "recording-medium cartridge" hereunder wherever appropriate) and of which the recording medium once encased therein cannot be replaced with another, so it can be loaded into a recorder and/or player dedicated for the recording-medium cartridge.

Note that the first recording medium holder is provided on the main side of the middle shell while the second recording medium holder is provided in a lower position than the first recording medium holder. For example, the second recording medium holder is defined by a third opening somewhat larger than the second recording medium and through which the pair of shutter members provided on the main side of the middle shell is exposed to outside, and a concavity formed on the main side of the middle shell, somewhat larger than the second recording medium and of which the depth is smaller than its surrounding.

The cartridge according to the present invention may have come-off preventive mechanisms provided around the insertion/removal opening to prevent the recording medium received in the recording medium receptacle through the insertion/removal opening from coming off. For example, each of the come-off preventive mechanism is composed of an insertion guide to guide the first recording medium being inserted into the first recording medium holder and a come-off preventive piece to prevent the first recording medium held in the first recording medium holder from coming off. The come-off preventive mechanism is formed integrally on contact with elastically flexible pieces which are elastically moved radially of the recording medium receptacle. The come-off preventive mechanism may be provided in a plurality of places around the insertion/removal opening to positively hold the first recording medium in the first recording medium holder.

The come-off preventive mechanisms in the above cartridge according to the present invention may be as will be described below. That is, each of the come-off preventive mechanisms includes a come-off preventive member to prevent the first recording medium held in the first recording medium holder from coming off. This come-off preventive member is received in a receiver formed in the wall of the insertion/removal opening in the upper shell. The come-off preventive member includes a come-off preventive piece to prevent the first recording medium held in the first recording medium holder from coming off, elastically flexible pieces each having an engagement portion formed at one end thereof, and an operating piece to move the come-off preventive mechanism between a come-off preventive position where the come-off preventive mechanism is to prevent the first recording medium held in the first recording medium from coming off and an access position in which the first recording medium is to be inserted and/or removed. Correspondingly, the receiver includes a first engagement concavity in which the engagement portion is engaged when the come-off preventive mechanism holds the come-off preventive member in the come-off preventive position, and a second engagement concavity in which the engagement portion is engaged when the come-off preventive mechanism holds the come-off preventive member in the access position. The come-off preventive mechanism may be provided in a plurality of places in order to prevent the first recording medium from being caused by a wrong operation to run off the first recording medium holder.

Further, the above cartridge according to the present invention may be provided with a cover as a come-off preventive means to uncover and cover the insertion/removal opening. Also, the cartridge may be provided with a locking mechanism to lock the cover in closed position. The locking mechanism has a cover operating member disposed in the receiver formed in the wall of the insertion/removal opening in the upper shell. The cover operating member includes a first elastically flexible piece having provided at an end thereof a locking portion which is engaged on the engagement piece on the cover, a second elastically flexible piece having an engagement portion provided at an end thereof, and an operating portion which moves the cover operating member between a locking position in which the locking portion is engaged on the engagement piece and an unlocking position in which the locking portion is not disengaged on the engagement piece. Correspondingly, the receiver includes a first engagement concavity in which the engagement portion is to be engaged when the cover operating member is held in the locking position, and a second engagement concavity in which the engagement portion is to be engaged when the cover operating member is held in the unlocking position. The locking mechanism may be provided in a plurality of places around the insertion/removal opening in order to prevent the cover from being unlocked by a wrong operation, the cover from opening the insertion/removal opening and thus the recording medium held in the recording medium holder from coming off.

Also the above object can be attained by providing a cartridge for encasing a recording medium smaller in diameter than a recording medium of a standard size, the cartridge including according to the present invention, a cartridge body consisting of an upper shell and lower shell, butted to each other, the upper shell having formed in the main side thereof an insertion/removal opening through which a small recording medium larger than at least the small-diameter recording medium is inserted and/or removed and the lower shell having a first opening formed therein, a middle shell having the main side thereof exposed to outside through the insertion/removal opening in the upper shell, having a second opening formed in the main side thereof correspondingly to the first opening in the lower shell and which is rotatably received in the cartridge body, and a pair of shutter members installed to the middle shell at the side of the lower shell side and which uncovers the first and second openings when the middle shell rotates until the first and second openings are aligned with each other. The cartridge has provided in the main side of the middle shell a recording medium holder in which a small recording medium is rotatably held. That is, the cartridge, having received therein a user's desired small recording media put in the recording medium holder, is loaded into a recorder and/or player. Since this cartridge is formed to have a similar construction including a pair of shutter members, except for the insertion/removal opening formed in the upper shell and recording medium holder formed on the middle shell for a small recording medium, to a cartridge having a recording medium pre-encased therein (will be referred to as "recording-medium cartridge" hereunder wherever appropriate) and of which the recording medium once encased therein cannot be replaced with another, so it can be loaded into a recorder and/or player dedicated for the recording-medium cartridge.

Any other cartridge than the above according to the present invention may be provided around the recording medium holder thereof with a come-off preventive mechanism to prevent a small recording medium held in the recording medium holder from coming off. For example, the come-off preventive mechanism is composed of a recording medium insertion guide to guide a recording medium being inserted into the recording medium holder and a come-off preventive mechanism to prevent the recording medium held in the recording medium holder from coming off. The come-off preventive mechanism is formed integrally on contact with elastically flexible pieces which are elastically moved radially of the recording medium receptacle. The come-off preventive mechanism may be provided in a plurality of places around the recording medium holder.

These objects and other objects, features and advantages of the present invention will become more apparent from the following detailed description of the best mode for carrying out the present invention when taken in conjunction with the accompanying drawings.

BEST MODE FOR CARRYING OUT THE INVENTION

The cartridge according to the present invention will be explained herebelow with reference to the accompanying drawings.

Figure 1:
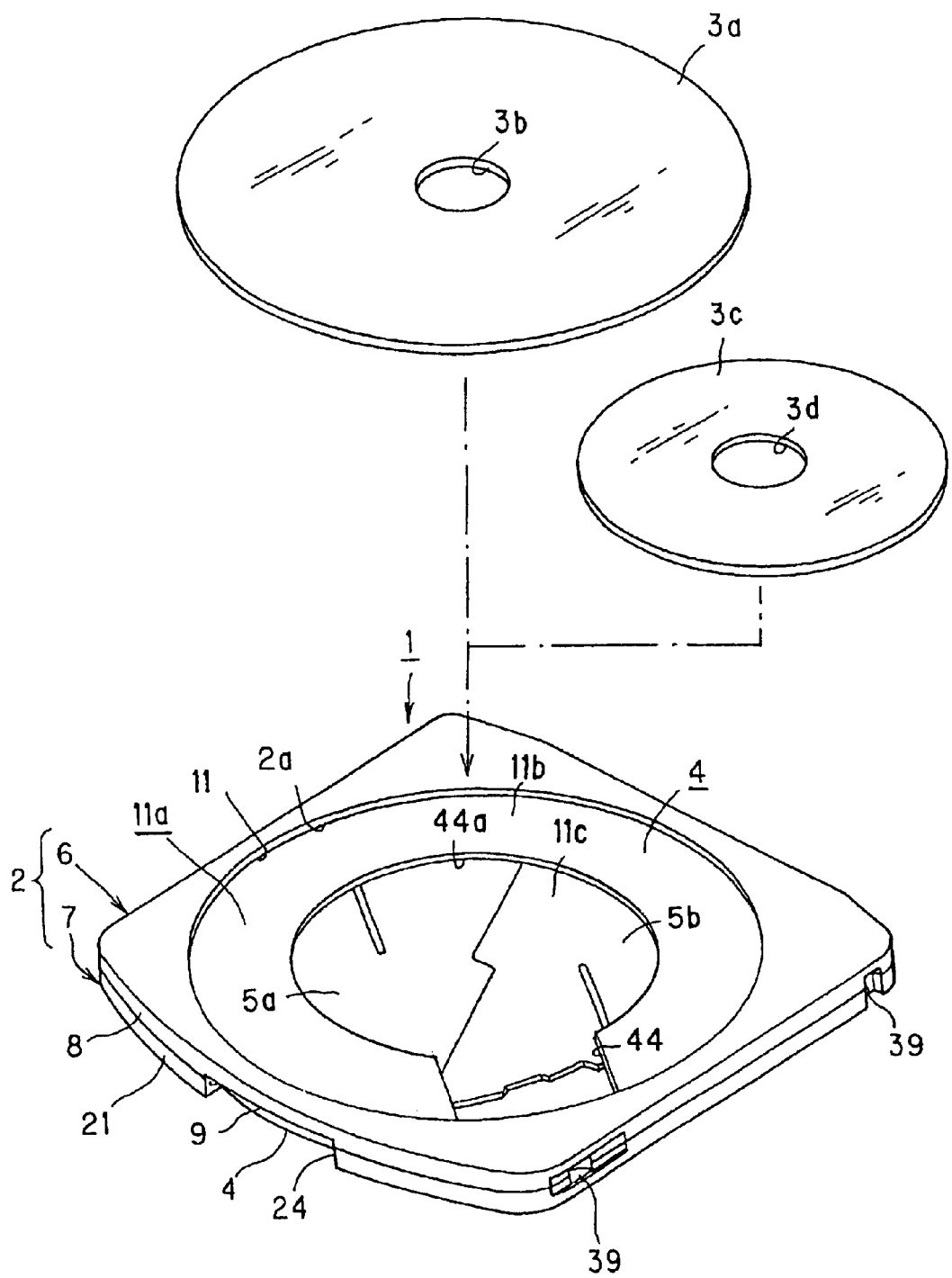
FIG. 1 is a perspective view, from the upper shell, of the cartridge according to the present invention.
Figure 2:
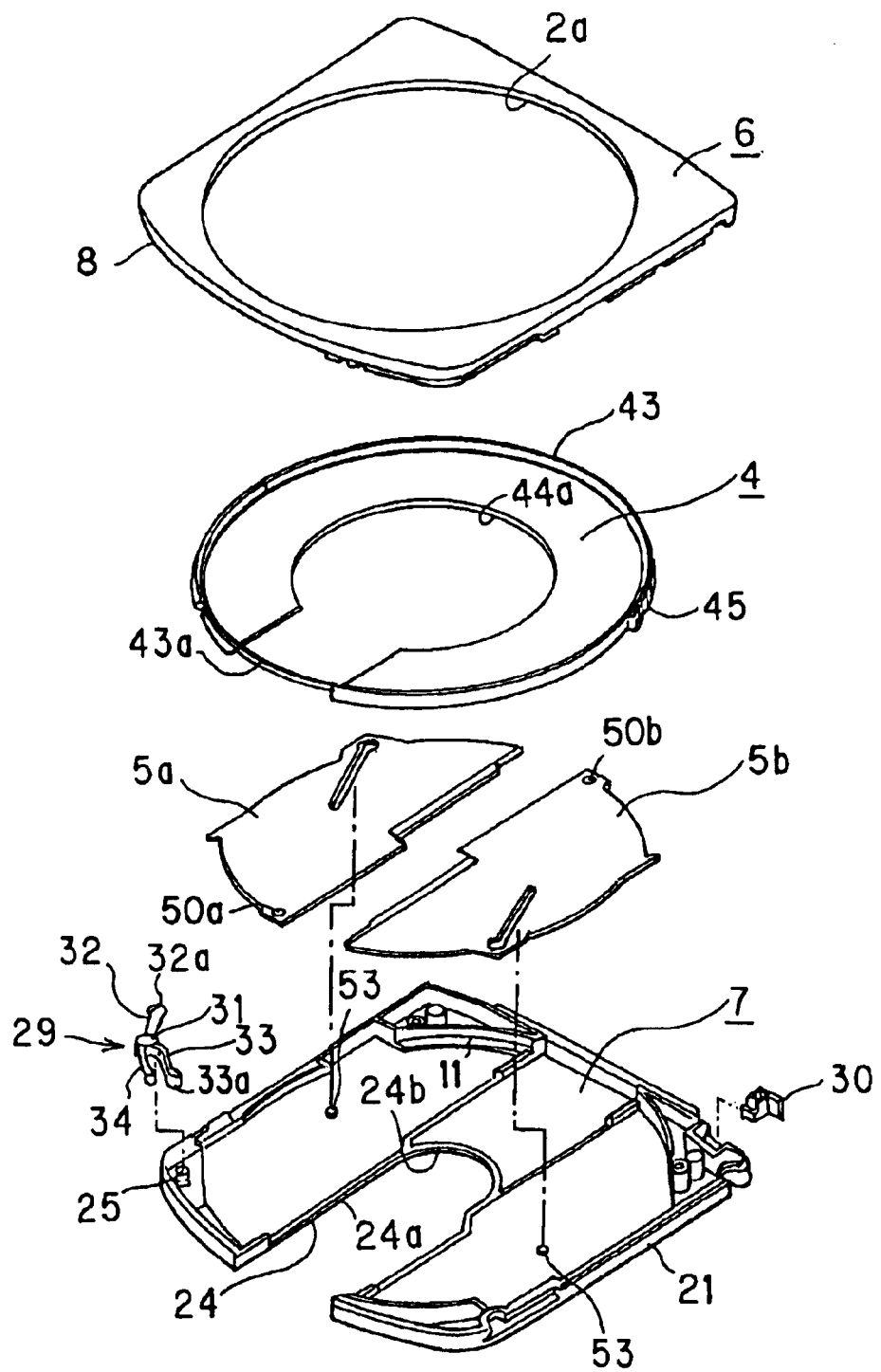
FIG. 2 is an exploded perspective view of the cartridge shown in FIG. 1.
Figure 3:
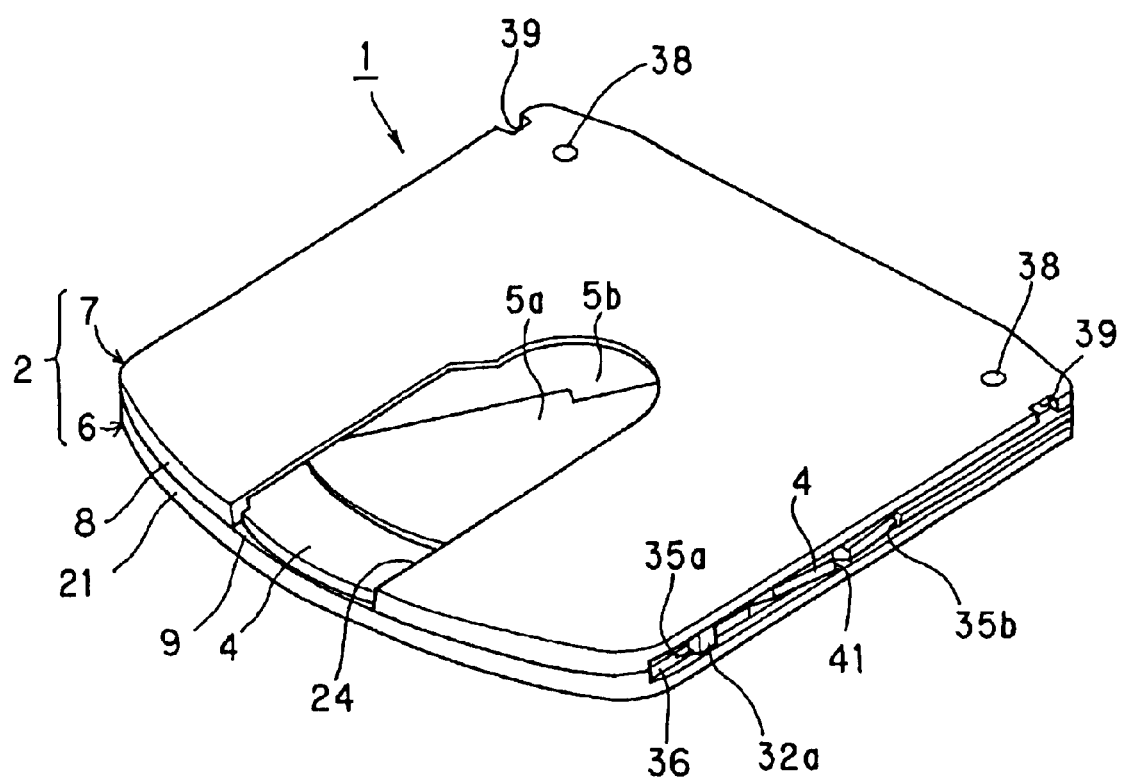
FIG. 3 is a perspective view, from the lower shell, of the cartridge shown in FIG. 1.

The cartridge according to the present invention is generally indicated with a reference 1 through FIGS. 1 to 35. It is used as a caddy for encasing an optical disc therein. As shown in FIGS. 1 to 3, the cartridge 1 includes a cartridge body 2 consisting of a pair of shells, upper and lower, 6 and 7, combinable with each other. The container body 2 incorporates an inner rotor 4 serving as a middle shell, and a pair of shutter members 5a and 5b. First and second optical discs 3a and 3c of different diameters are selectively inserted into or removed from the cartridge 1.

A selected one of the first optical disc 3a having a diameter of 120 mm for example and the second optical disc 3c having a diameter of 80 mm is held in the cartridge 1 as shown in FIG. 1. Each of the optical discs 3a and 3c has formed in the center thereof a central hole 3b or 3d in which the disc rotation drive mechanism of a disc recorder/player is to be engaged. It should be noted that the recording medium may be magneto-optical disc, magnetic disc or the like in addition to the optical disc. Also, the recording medium may be a read-only optical disc. Further, the recording medium is not limited to a disc-shaped one but may be a card-shaped one.

Figure 4:
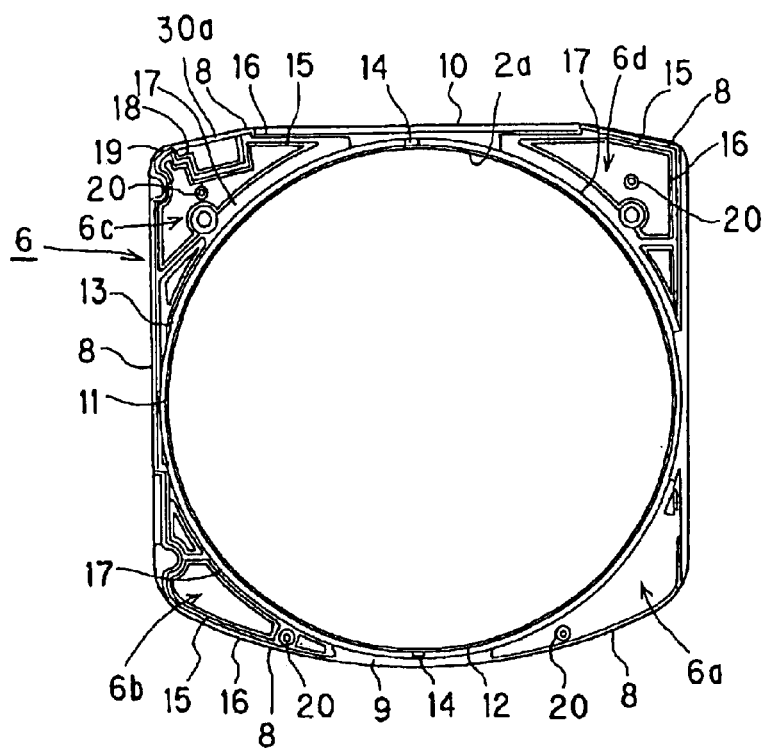
FIG. 4 is a plan view of the inside of the upper shell of the cartridge shown in FIG. 1.

As shown in FIG. 4, the upper shell 6 is formed by injection molding of a thermoplastic synthetic resin such as acrylonitrile butadiene styrene (ABS) for example. The upper shell 6 is formed to have a generally rectangular shape of which the front end which will be first inserted into the recorder/player is shaped like a generally circular arc. The upper shell 6 has formed integrally therewith an outer wall 8 protruding from the perimeter of the main side and which defines the lateral face of the cartridge body 2.

Figure 14:
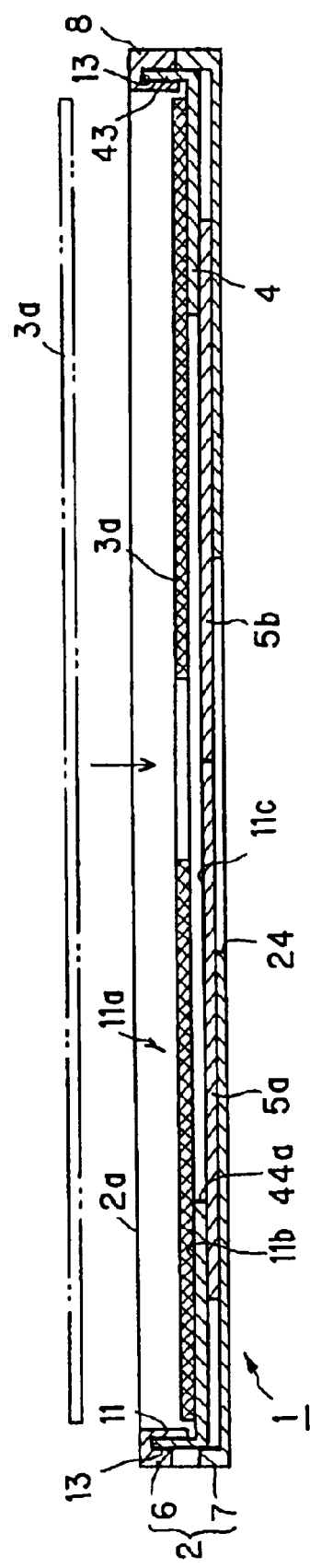
FIG. 14 is a sectional view of the cartridge in which the first optical disc of the standard size is held in the first disc holder.

The outer wall 8 has formed, by cutting, in the front center thereof a first pickup access opening 9 into which the optical pickup of the recorder/player 70 can be brought. Also, the outer wall 8 has formed, by cutting, in the rear center thereof a positioning concavity 10 with reference to which the upper shell 6 is positioned in relation to the lower shell 7. Further, the upper shell 6 has formed therein a disc insertion/removal circular opening 2a whose wall 11 is inscribed in the outer wall 8. The wall 11 of the insertion/removal opening 2a (will be referred to as "opening wall" hereunder) defines a disc receptacle in which the optical disc 3a or 3c is rotatably held. The opening wall 11 has formed, by cutting, in the front center thereof a second pickup access opening 12 into which the optical pickup 75 of the recorder/player 70 which will be described in detail later is to be brought. As shown in FIG. 14, the opening wall 11 defines together with the main side of an inner rotor 4 which will be described in detail later a disc receptacle 11a in which the optical disc 3a or 3c is rotatably held.

Between the opening wall 11 and outer wall 8, there is formed a rising wall to surround the opening wall 11. The opening wall 11 and rising wall define together a generally circular guide recess 13 in which the inner rotor 4 is rotatably engaged. The guide recess 13 has formed on the bottom thereof in the front center and rear center a pair of lift-up projections 14 which will move the inner rotor 4 away from the upper shell 6.

As shown, the upper shell 6 has four corners 6a, 6b, 6c and 6d. Of these corners, one front corner 6a forms a locking member receiver in which a locking member to lock the shutter members 5a and 5b is received. At the remaining corners 6b, 6c and 6d, there are formed rising upper corner walls 15, respectively, which prevent dust from entering the cartridge inside. Each of the upper corner walls 15 is defined between the outer wall 8 and guide recess 13. A first recess 16 is formed between each upper corner wall 15 and outer wall 8, and a second recess 17 is defined between the upper corner wall 15 and guide recess 13.

The upper shell 6 has formed at the rear corner 6c thereof an upper rising wall 18 defining a write protection member receiver in which a write protection member is held. A third recess 19 is defined between the upper rising wall 18 and upper corner wall 15.

The upper shell 6 has formed near each of the corners 6a, 6b, 6c and 6d thereof a coupling boss 20 for coupling to the lower shell 7. Each of the coupling boss 20 has formed in the center thereof a screwing hole.

As shown in FIGS. 1, 2 and 4, the upper shell 6 has formed therein the disc insertion/removal opening 2a for replacement of the optical disc 3a or 3c held in the disc receptacle 11a. For smooth insertion or removal of the first optical disc 3a having the larger diameter, the disc insertion/removal opening 2a is formed to have a little larger diameter than the diameter of the first optical disc 3a. More specifically, the disc insertion/removal opening 2a is defined by the opening wall 11 of the upper shell 6.

Figure 5:
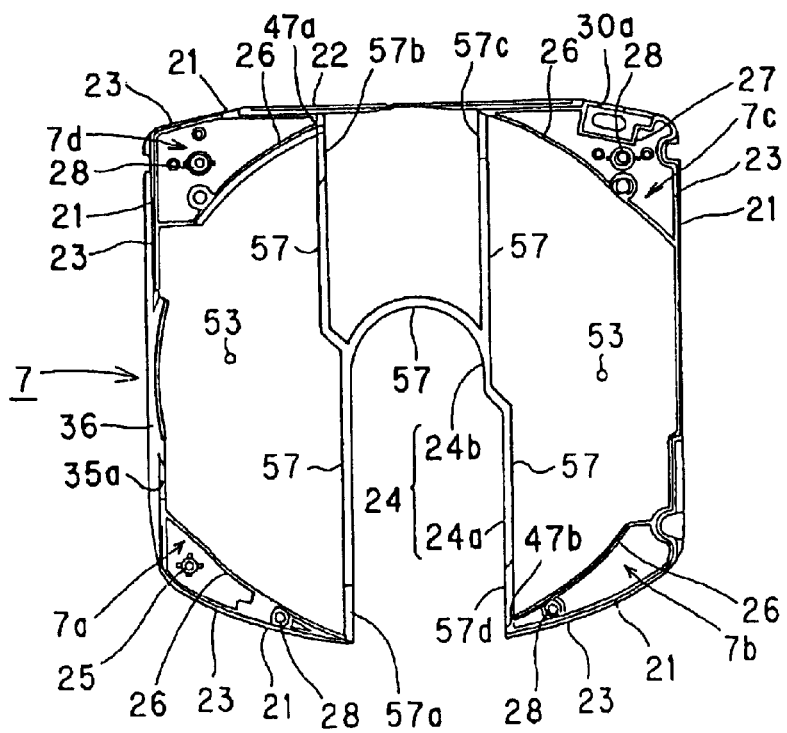
FIG. 5 is a plan view of the inside of the lower shell of the cartridge shown in FIG. 1.

As shown in FIGS. 2, 3 and 5, the lower shell 7 to be coupled to the upper shell 6 constructed as having been described above is formed by injection molding of a thermoplastic synthetic resin such as acrylonitrile butadiene styrene (ABS) for example similarly to the aforementioned upper shell 6. The lower shell 7 is formed to have a generally rectangular shape whose front end which will first be inserted into the recorder/player is formed to have a generally circular arc shape. The lower shell 7 has formed integrally therewith an outer wall 21 protruding from the perimeter of the main side and which also defines the lateral face of the cartridge body 2.

The outer wall 21 has formed at the rear side thereof a positioning wall 22 which is engaged in the aforementioned positioning concavity 10 of the upper shell 6 to align the upper and lower shells 6 and 7 with each other. Also, the outer wall 21 has formed at the rear side thereof a dustproof wall 23 which is engaged in the first recess 16 of the upper shell 6 to prevent dust or the like from entering the cartridge from between the upper and lower shells 6 and 7.

The lower shell 7 has formed in the front center of the outer wall 21 an opening 24 into which the optical pickup and disc table can be brought. The opening 24 is defined by a generally rectangular write/read opening 24a through which the signal recording surface of the optical disc 3a or 3c is partially exposed to outside in a range from the front open end to the inner circumference of the disc, and a disc rotation drive opening 24b contiguous to the write/read opening 24a and through which the central hole 3b or 3d in the optical disc 3a or 3c is exposed to outside. More specifically, the write/read opening 24a is formed to have sufficient dimensions to bring the optical pickup of the recorder/player to a depth of the cartridge body 2, and the disc rotation drive opening 24b is formed to have sufficient dimensions to bring the disc table include in the disc rotation drive mechanism of the recorder/player 70 can be brought to a depth of the cartridge body 2.

The lower shell 7 has four corners 7a, 7b, 7c and 7d. At one front corner 7a of these corners, forming the locking member receiver, there is formed a projecting pivot 25 to support the locking member 29 pivotably. At the corners 7b, 7c and 7d except for the front corner 7a, there are formed generally arc-shaped lower corner walls 26, respectively, which are to be engaged in the second recesses 17, respectively, at the aforementioned upper shell 6. Further, at one rear corner 7c, there is formed a rising lower wall 27 which is to be engaged in the third recess 19 at the upper shell 6. The lower shell 7 has formed thereon a generally cylindrical coupling cap 28 which is to be fitted on the coupling boss 20 at the upper shell 6. The coupling cap 28 has formed in the center thereof a through-hole through which a set screw is penetrated.

For coupling the upper and lower shells 6 and 7 to each other, the positioning wall 22 at the lower shell 7 is engaged in the positioning concavity 10 at the upper shell 6, the coupling cap 28 at the lower shell 7 is fitted on the coupling boss 20 at the upper shell 6, and the dustproof wall 23, lower corner wall 26 and rising lower wall 27 at the lower shell 7 are engaged in the first, second and third recesses 16, 17 and 19, respectively, at the upper shell 6. A set screw is screwed into the screw hole in the coupling boss 20 through the through-hole in the coupling cap 28.

As shown in FIG. 14, when the upper and lower shells 6 and 7 are superposed on each other, the cartridge body 2 will have defined by the opening wall 11 and main side of the inner rotor 4 the disc receptacle 11a almost inscribing the perimeter of the cartridge body 2 and in which the optical disc is held, also defined at one front corner thereof the locking member receiver in which the locking member 29 is pivotably held, and further defined at one rear corner thereof the receiver in which a write protection member 30 is slidably held.

When the inner rotor 4 is in a position where it covers the opening 24 in the cartridge body 2, the locking member 29 locks the inner rotor 4 against rotation. As shown in FIG. 2, the locking member 29 includes an engagement hole 31 in which the pivot 25 of the lower shell 7 is rotatably engaged, an operating piece 32 extending from the engagement hole 31 toward one lateral side of the cartridge body 2, a stop piece 33 extending from the engagement hole 31 toward the disc receptacle 11a, and an elastically flexible piece 34 extending from the engagement hole 31 toward the front inner wall of the cartridge body 2. The operating piece 32 has provided at the end thereof an operating projection 32a projected to outside through a locking opening 35a formed in one lateral side of the cartridge body 2. The stop piece 33 has provided at the end thereof a stop projection 33a sliding on a ring portion 43 of the inner rotor 4. The elastically flexible piece 34 abuts, in an elastically deformed shape, the front inner side of the cartridge body 2. Therefore, the elastically flexible piece 34 forces, by its elasticity, the opening projection 32a of the operating piece 32 in a direction of projecting out of the locking opening 35a, and the stop projection 33a of the stop piece 33 in a direction of abutting the ring portion 43 of the inner rotor 4 and engagement into a second engagement concavity 42 of the inner rotor 4. When the operating projection 32a of the operating piece 32 of the locking member 29 is pressed, the stop piece 33 is moved away from the ring portion 43 of the inner rotor 4 against the elasticity of the elastically flexible piece 34 and the stop projection 33a is disengaged from the second engagement concavity 42.

The write protection member 30 is exposed at an operating piece thereof to outside through a through-hole 30a formed at the back of the cartridge body 2. The operating piece can be moved along the back of the cartridge body 2 between a "writing possible" position where it uncovers an access hole and a "data protected" position where it covers the access hole.

As shown in FIG. 3, the cartridge body 2 has a guide recess 36 formed on one lateral side thereof in an intermediate position between the front and back of the cartridge body 2. This guide recess 36 is provided to prevent the cartridge 1 from being inserted incorrectly into the recorder/player. In the bottom of the guide recess 36, there are formed a locking opening 35a through which the aforementioned operating projection 32a of the locking member 29 is projected to outside and an inner rotor access opening 35b through which the inner rotor 4 is exposed partially at the perimeter thereof to outside. As shown in FIG. 3, in the bottom of the cartridge body 2, formed by the lower shell 7, there is formed a plurality of positioning concavities 38 to position the cartridge 1 when loaded in the recorder/player 70. Also, on either lateral side of the cartridge body 2, there is formed a plurality of cuts 39 in which there will be engaged a loading arm to pull the cartridge 1 yet in the recorder/player 70 into place.

Figure 6:
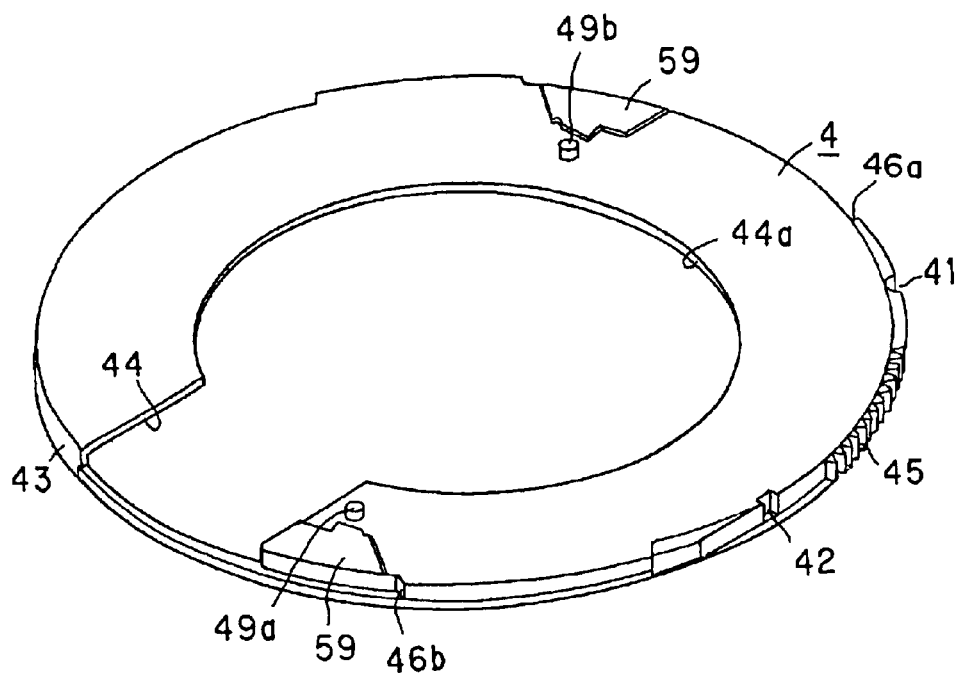
FIG. 6 is a perspective view of the inner rotor.
Figure 7:
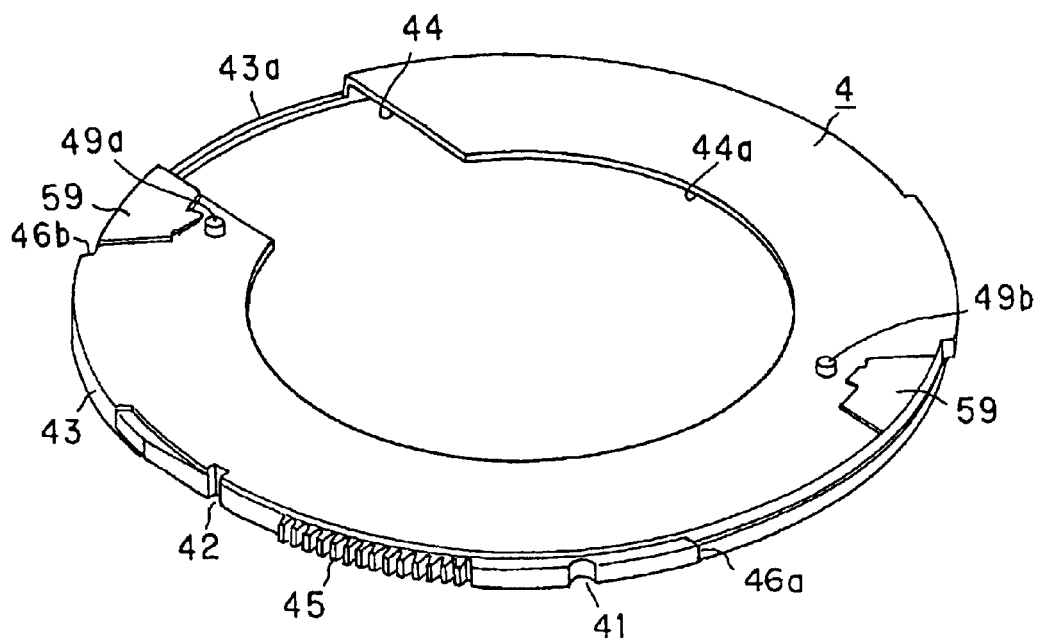
FIG. 7 is a perspective view, from another direction, of the inner rotor.

As shown in FIGS. 6 and 7, the inner rotor 4 is formed by injection molding of a thermoplastic synthetic resin such as polyoxymethylene (POM) for example. When the inner rotor 4 is placed inside the cartridge body 2, it will define the disc receptacle 11a by the main side thereof, opening wall 11 of the upper shell 6 and the main side of each of the shutter members 5a and 5b exposed to outside through an opening 44a formed in the center thereof as shown in FIG. 14.

The inner rotor 4 is formed to have a generally circular shape whose perimeter is formed as the ring portion 43 which is engaged in the aforementioned guide recess 13 of the upper shell 6. With the ring portion 43 engaged in the guide recess 13 of the upper shell 6, the inner rotor 4 is rotatably supported by the cartridge body 2. The inner rotor 4 has also an opening 44 formed in the main side thereof. The opening 44 is a second opening and is generally the same in dimensions as the opening 24, as the first opening, in the lower shell 7. The inner rotor 4 has formed in the main side thereof a generally circular opening 44a contiguous to the opening 44 and which holds the second optical disc 3c smaller in diameter than the first optical disc 3a. The opening 44a as a third opening is formed to have a somewhat larger size than that of the second optical disc 3c for smooth insertion and removal of the latter. Also a portion of the ring portion 43, corresponding to the opening 44, is formed from a coupling 43a. The openings 44 and 44a are uncovered and covered with the pair of shutter members 5a and 5b.

As shown, the ring portion 43 has formed on the outer periphery thereof a geared portion 45 which rotates the inner rotor 4. The gear portion 45 extends between a position where the inner rotor 4 is exposed partially at the perimeter thereof to outside through the front portion of the inner rotor access opening 35b when it covers the opening 24 in the lower shell 7 as shown in FIG. 8, and a position where the inner rotor 4 is exposed partially at the perimeter thereof to outside through the rear portion of the inner rotor access opening 35b when it uncovers the opening 24 in the lower shell 7 as shown in FIG. 9.

Also, the inner rotor 4 has formed on the outer periphery thereof at one side of the geared portion 45 a first engagement concavity 41 in which a first engagement projection of a shutter releasing member included in a shutter release mechanism at the recorder/player, and at the other side of the geared portion 45 a second engagement concavity 42 in which a second engagement projection of the shutter releasing member is engaged. These engagement concavities 41 and 42 are exposed along with the geared portion 45 to outside through the inner rotor access opening 35b. When the cartridge 1 is loaded into the recorder/player, the first engagement concavity 41 has first engaged therein the first engagement projection of the shutter releasing member. When the pair of shutter members 5a and 5b is in the closed position, the second engagement concavity 42 has engaged therein the stop projections 33a of the locking member 29. When the pair of shutter members 5a and 5b moved to the position where it uncovers the openings 24 and 44, the second engagement concavity 42 will receive the second engagement projection of the shutter releasing member.

The ring portion 43 has a pair of rotation limiting projections 46a and 46b formed spaced a predetermined interval on the outer periphery thereof to limit the rotation of the inner rotor 4. On the other hand, the upper shell 6 has formed between the guide recess 13 and upper corner wall 15 a pair of limiters 47a and 47b which abut the pair of inner-rotor rotation limiting projections 46a and 46b, respectively. As shown in FIG. 9, when the inner rotor 4 rotates in a direction of uncovering the opening 24, one of the rotation limiting projections (46a) engages on one of the pair of limiters (47a) to prevent a further rotation of the inner rotor 4. When the inner rotor 4 is thus limited from rotating in this direction, it is in a position where it uncovers the opening 24 and the opening 44 in the inner rotor 4 is nearly aligned with the opening 24 in the cartridge body 2. On the other hand, as shown in FIG. 8, when the inner rotor 4 rotates in a direction of covering the opening 24, the other inner-rotor rotation limiting projection 46b engages on the other limiter 47b to prevent a further rotation of the inner rotor 4. When the inner rotor 4 is limited against rotation in this direction, it is in a position where it covers the opening 24 and the opening 44 in the inner rotor 4 is most inclined in relation to the opening 24 of the cartridge body 2.

Figure 8:
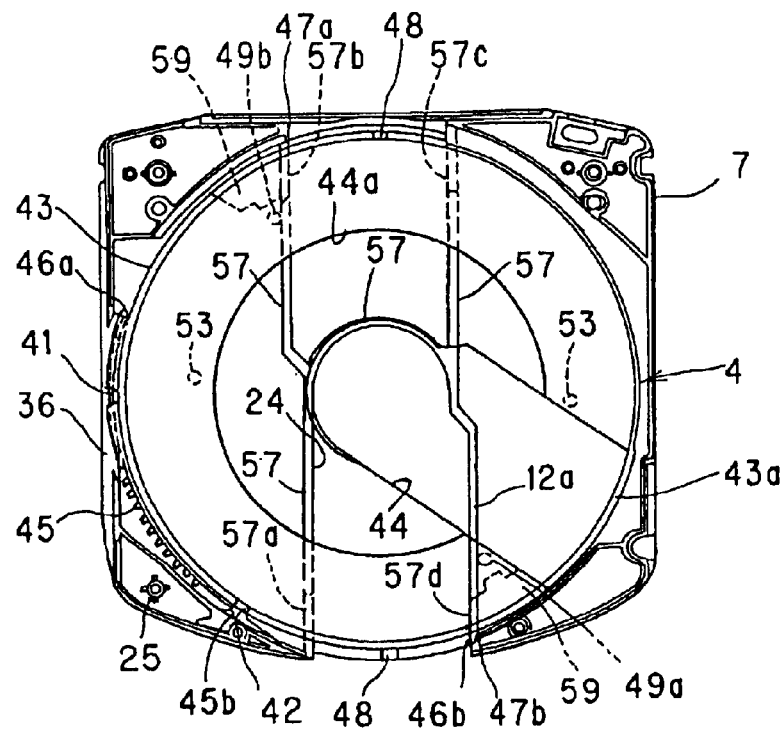
FIG. 8 is a plan view of the inner rotor in a position where it covers the opening in the lower shell.
Figure 9:
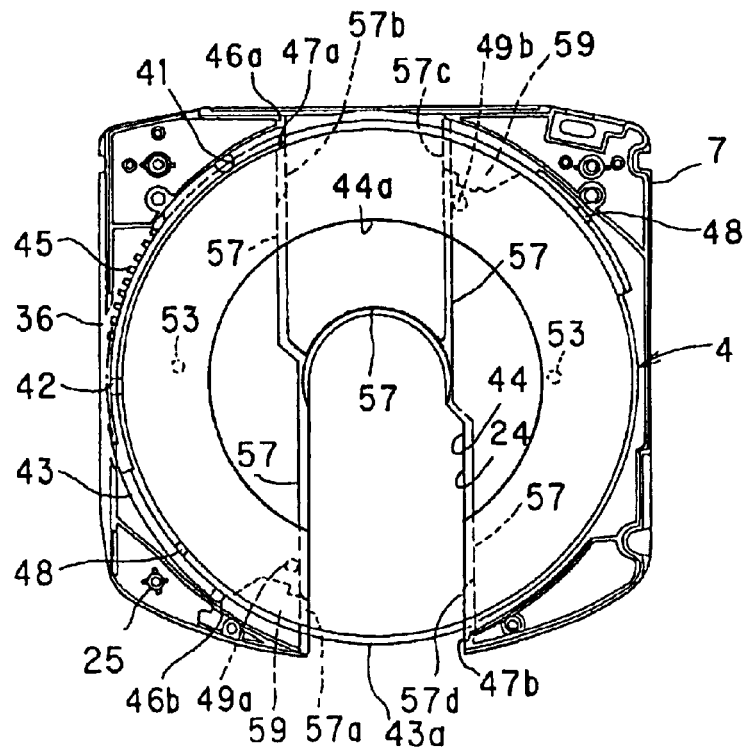
FIG. 9 is a plan view of the inner rotor in a position where it uncovers the opening in the lower shell.

As shown in FIGS. 8 and 9, the ring portion 43 has formed thereon a pair of lift-up projections 48 which slide on the aforementioned pair of lift-up projections 14 formed on the bottom of the guide recess 13. When the inner rotor 4 is close to the position where it covers the opening 24, the lift-up projections 48 slide onto the lift-up projections 14, respectively, in the guide recess 13 and thus lift up the inner rotor 4 away from the upper shell 6.

As shown in FIGS. 6 to 9, the inner rotor 4 has formed on the main side thereof opposite to that on which the ring portions 43 are formed a pair of projecting pivots 49a and 49b which support the pair of shutter members 5a and 5b rotatably. The pair of pivots 49a and 49b is located in positions, respectively, symmetrical with the center of the inner rotor 4, that is, with a phase difference of 180 deg. from each other.

Figure 10:
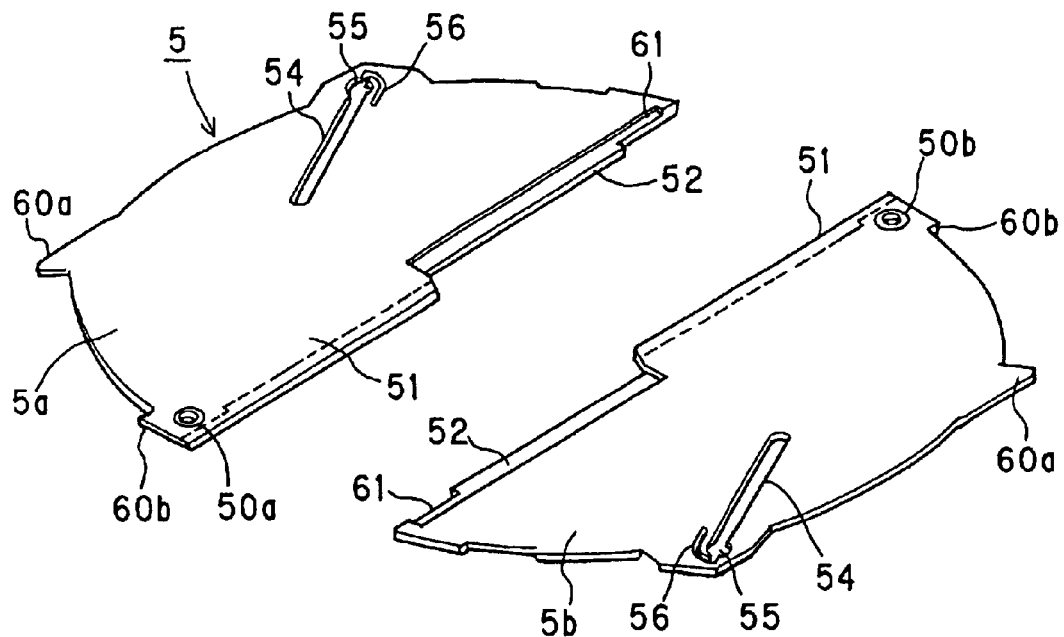
FIG. 10 is a perspective view, from the upper shell, of the pair of shutter members.
Figure 11:
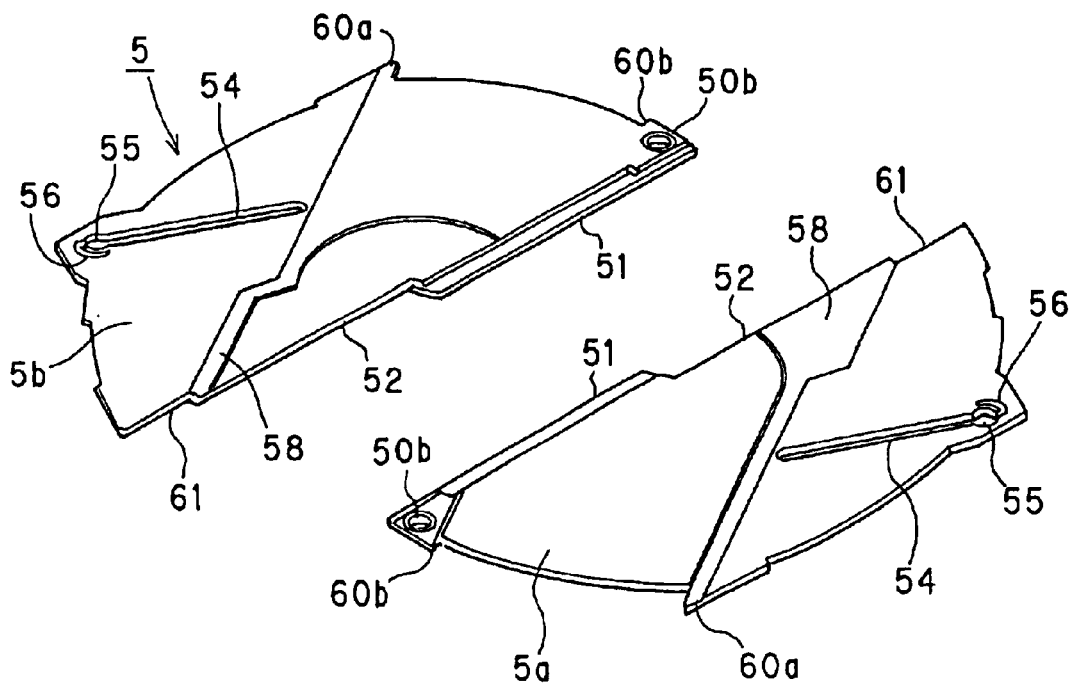
FIG. 11 is a perspective view, from the lower shell, of the pair of shutter members.

As shown in FIGS. 10 and 11, the shutter members 5a and 5b placed on the above inner rotor 4 to cover and uncover the openings 44 and 44a in the inner rotor 4 have symmetrical shapes and are installed on the pair of pivots 49a and 49b, respectively, of the inner rotor 4 to be pivotable with a phase difference of 180 deg. between them.

Similarly to the inner rotor 4, the shutter members 5a and 5b are formed by injection molding of a thermoplastic synthetic resin such as polyoxymethylene (POM) for example. Each of the shutter members 5a and 5b is formed to have a generally meniscal shape whose base portion has formed therein an engagement hole 50a or 50b in which the aforementioned pivot 49a or 49b of the inner rotor 4 is pivotably engaged.

Figure 12:
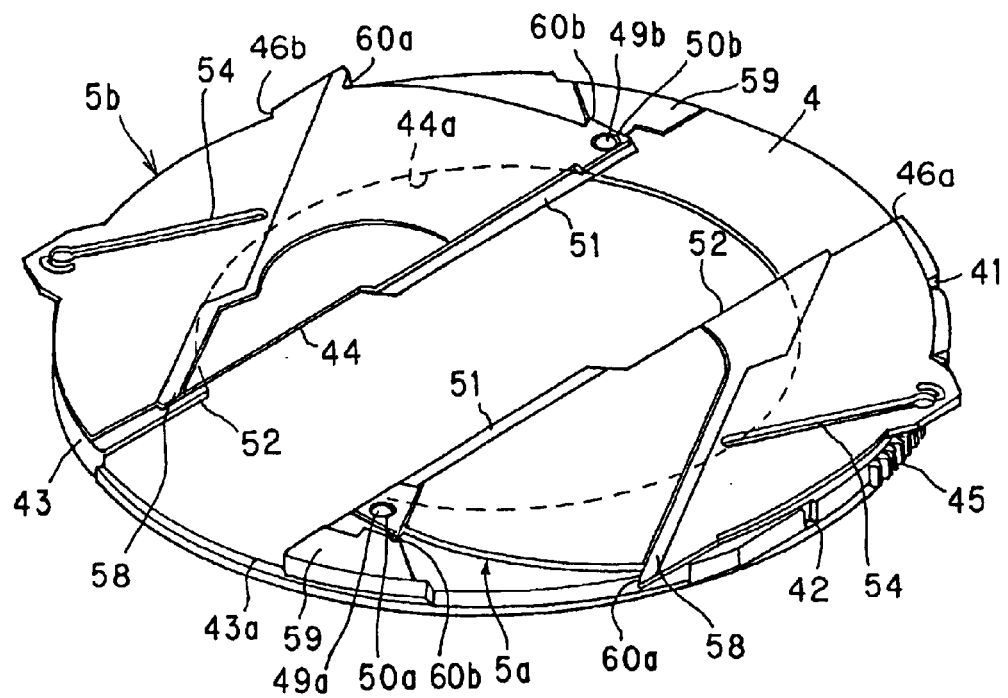
FIG. 12 is a perspective view of the pair of shutter members in a position where it uncovers the opening in the inner rotor.
Figure 13:
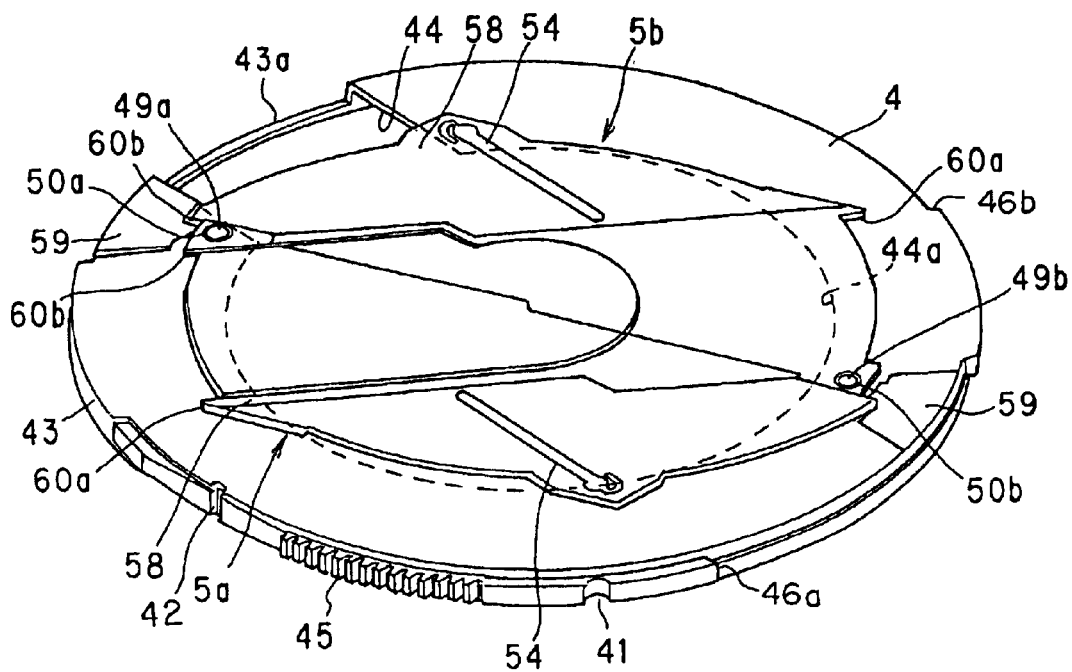
FIG. 13 is a perspective view of the pair of shutter members in a position where it covers the opening in the inner rotor.

Each of the shutter members 5a and 5b has formed on the string-like butting face thereof a first engagement potion 51 extending from the central portion toward the base and a second engagement portion 52 extending from the central portion toward the free end. The first engagement portion 51 is beveled at the side of the lower shell 7, while the second engagement portion 52 is beveled at the side of the upper shell 6. As shown in FIGS. 12 and 13, the shutter members 5a and 5b in pair are pivoted about the pivots 49a and 49b, respectively, on the inner rotor 4 toward or away from each other, the first engagement portion 51 of one of the shutter members (5a) engages on the second engagement portion 52 of the other shutter member 5b, while the first engagement portion 51 of the other shutter member 5b engages on the second engagement portion 52 of the one shutter member 5a.

Each of the shutter members 5a and 5b has formed therein a guide slot 54 in which one of a pair of guide pins 53 formed on the inner surface of the lower shell 7 shown in FIG. 7. The guide slot 54 extends over a predetermined length from the midpoint of the string-like butting face toward the engagement hole 50a or 50b such that the shutter member 5a or 5b can be turned between the covered and uncovered positions of the openings 44 and 44a. At the end of the guide slot 54 near the outer perimeter of the inner rotor 4, there are formed an engagement hole 55 and an elastic pushing piece 56. When the shutter member 5a or 5b is in the covered position thereof, the guide pin 53 of the lower shell 7 will be engaged in the engagement hole 55 and at the same time the elastic pushing piece 56 will push the guide pin 53 engaged in the engagement hole 55.

Note that as shown in FIG. 5, a dustproof rib 57 is formed all around the opening 24 in the lower shell 7 as well as along extensions of lateral edges of the opening 24 to prevent dust or the like from entering the cartridge 1. The dustproof rib 57 includes auxiliary ribs 57a, 57b, 57c and 57d whose end portions joining the outer wall 21 of the lower shell 7 are as high as the outer wall 21. When the shutter members 5a and 5b cover the opening 44, the dustproof rib 57 is engaged in dustproof recesses 58 formed in the shutter members 5a and 5b, respectively. As shown in FIGS. 12 and 13, the inner rotor 4 has also formed in the vicinity of each of the pair of pivots 49a and 49b thereof a disengagement projection 59 which cancels the engagement between the dustproof rib 57 and dustproof recesses 58. Each of these disengagement projections 59 in pair is formed as generally high as the dustproof rib 57. When the shutter member 5 moved from the position where it covers the opening 44 to the position where it uncovers the opening 44, the disengagement projection 59 cancels the engagement between the dustproof rib 57 and dustproof recesses 58.

As shown in FIGS. 10 and 11, each of the pair of shutter members 5a and 5b has formed thereon a first engagement piece 60a and second engagement piece 60b. When the pair of shutter members 5a and 5b is in the position where they cover the openings, the first engagement projection 60a engages on the auxiliary ribs 57a and 57c included in the dustproof rib 57, while the second engagement projection 60b engages on the other auxiliary ribs 57b and 57d. Each of the pair of shutter members 5a and 5b has formed in the free end portion of the second engagement portion 52 thereof a cut 61 in which the auxiliary ribs 57b and 57d included in the dustproof rib 57 are engaged when the pair of shutter members 5a and 5b are in the position where they uncover the openings.

The cartridge 1 constructed as having been described above is assembled as will be described below:

First, the upper shell 6 is placed with the inner surface directed upward, and then the ring portion 43 of the inner rotor 4 is engaged in the guide recess 13 of the upper shell 6. It should be noted that the inner rotor 4 should be pre-positioned in relation to the upper shell 6 such that the opening 44 in the inner rotor 4 and the first and second pickup access openings 9 and 12 are aligned with each other.

Next, the pair of shutter members 5a and 5b is installed to the inner rotor 4. More specifically, with the pair of shutter members 5a and 5b being butted at the butting faces thereof to each other, the pivots 49a and 49b of the inner rotor 4 are engaged into the engagement holes 50a and 50b. Thereby, the shutter members 5a and 5b in pair are installed to be pivotable about the pivots 49a and 49b, respectively, of the inner rotor 4. Also, the pair of shutter members 5a and 5b is pre-positioned in relation to the inner rotor 4 so that the butting faces of the pair of shutter members 5a and 5b come to the edges of the openings 44 and 44a, respectively, in the inner rotor 4. Further, at the same time or before or after the pre-positioning, the pivot 25 on the lower shell 4 is inserted in the engagement hole 31 in the locking member 29, the locking member 29 is installed, and also the write protection member 30 is disposed in position.

Next, the lower shell 7 is joined to the upper shell 6. More specifically, with the outer walls 8 and 21 of the upper and lower shells 6 and 7, respectively, being butted to each other, the positioning wall 22 of the lower shell 7 is engaged in to the positioning concavity 10 of the upper shell 6. Thus, the coupling cap 28 at the lower shell 7 will be fitted on the coupling boss 20 at the upper shell 6. Also, the dustproof wall 23, lower corner wall 26 and rising lower wall 27 at the lower shell 7 will be engaged in the first, second and third recesses 16, 17 and 19, respectively, at the upper shell 6.

The guide pin 53 at the lower shell 7 will be engaged in the guide slot 54 in each of the shutter members 5a and 5b. By pre-positioning the pair of shutter members 5a and 5b in relation to the inner rotor 4, the lower shell 7 and pair of shutter members 5a and 5b can easily be positioned in relation to each other at this time. The set screw is screwed into the screw hole in the coupling boss 20 through the through-hole in the coupling cap 28. Thus, the lower shell 7 is joined to the upper shell 6 and thus the cartridge body 2 is formed. At this time, the inner rotor 4 and pair of shutter members 5a and 5b are in their respective positions where they do not cover the openings 24 and 44, respectively.

Next, the geared portion 45 is operated to rotate the inner rotor 4 in a direction of covering the openings 24 and 44, whereby the pair of shutter members 5a and 5b will cover the opening 24 in the cartridge body 2. With the above operations, the cartridge 1 is completely assembled. As seen from the foregoing explanation, it will be clear that the cartridge 1 according to the present invention uses a reduced number of parts and can be assembled extremely easily. Since no spring is used as a part, the cartridge 1 can easily be assembled. Since the cartridge 1 is assembled following the same assembling procedure as for a disc cartridge, it can manufactured in the disc cartridge assembling line.

Note that the lower shall 7 may be fixed to the upper shell 6 not only with the aforementioned set screw, but the upper and lower shells 6 and 7 may be joined integrally to each other with an adhesive, ultrasonic welding or the like.

Figure 16:
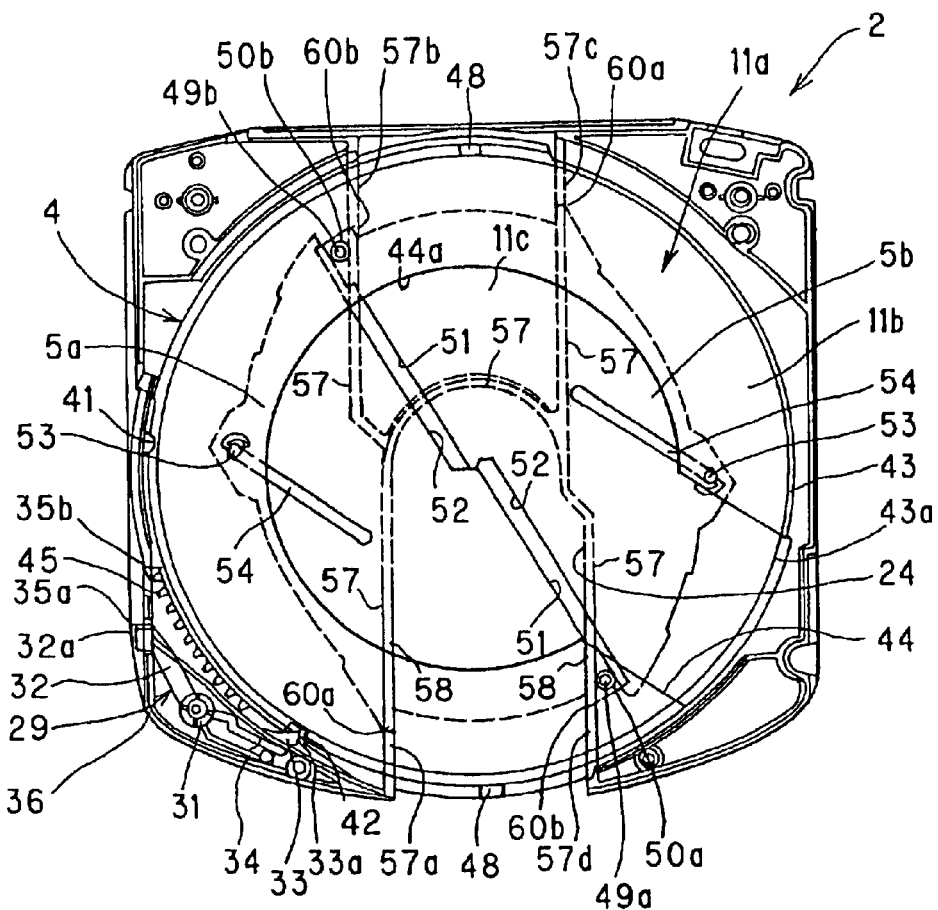
FIG. 16 is a plan view of the cartridge in which the pair of shutter members covers the opening in the lower shell.
Figure 17:
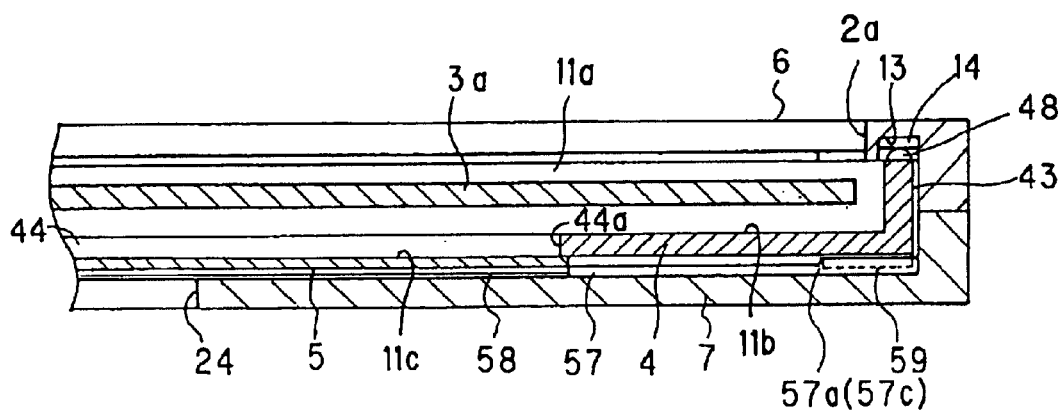
FIG. 17 is a segmentary sectional view of the cartridge, showing that the lift-up projections of the inner rotor are engaged on those of the upper shell.

The cartridge 1 constructed as having been described in the foregoing is in a state as shown in FIGS. 1 and 16. More particularly, with the stop projection 33a of the locking member 29 being engaged in the second engagement concavity 42 of the inner rotor 4, the pair of shutter members 5a and 5b is locked in the position where they cover the openings 24 and 44. At this time, the first engagement concavity 41 of the inner rotor 4 is exposed to outside through the inner rotor access opening 35b, and the opening projection 32a of the locking member 29 is exposed to outside through the locking opening 35a. When the cartridge 1 is loaded into the recorder/player, the shutter releasing mechanism at the recorder/player side will release the shutter locking so that the shutter members 5a and 5b can be pivoted. As shown in FIG. 17, the lift-up projection 14 slides onto the lift-up projection 48, so that the pair of shutter member 5a and 5b will be caught at both the sides thereof between the inner rotor 4 and lower shell 7. Therefore, the pair of shutter members 5a and 5b positively cover the openings 24 and 44 when the cartridge 1 is not in use. In this condition, the optical disc 3a or 3c can be introduced into, or removed from, the disc receptacle 11a of the cartridge 1 through the insertion/removal opening 2a in the upper shell 6.

Figure 15:
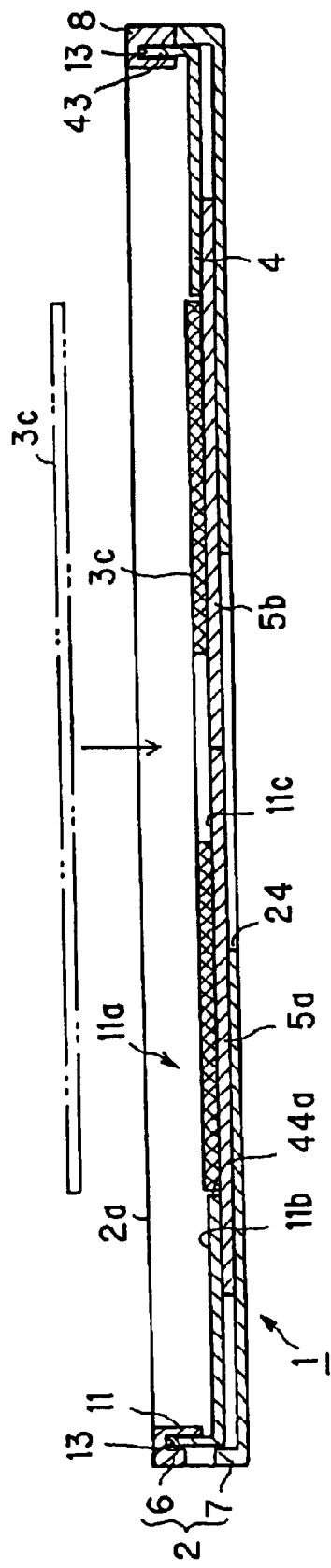
FIG. 15 is a sectional view of the cartridge in which the second optical disc smaller in diameter than the first optical disc is held in the second disc holder.

Also, the cartridge 1 has constructed in the cartridge body 2 thereof the disc receptacle 11a formed open through the insertion/removal opening 2a in the upper shell 6. The disc receptacle 11a is constructed to receive the first optical disc 3a having the standard size and also the second optical disc 3c smaller in diameter than the first optical disc 3a as shown in FIGS. 14 and 15. The disc receptacle 11a has provided therein a first disc holder 11b to hold the first optical disc 3a concentrically therewith, and a second disc holder 11c to hold the second optical disc 3c concentrically therewith. The first disc holder 11b is defined by the main side of the inner rotor 4 except for the openings 44 and 44a and the opening wall 11 of the upper shell 6, and the second disc holder 11c is defined in a position lower than the first disc holder 11b by the wall of the opening 44a and shutter members 5a and 5b.

As shown in FIG. 14, the first optical disc 3a, received in the disc receptacle 11a through the insertion/removal opening 2a, is rotatably held in the first disc holder 11b defined by the main side of the inner rotor 4 in which the opening 44a is formed and the opening wall 11 of the upper shell 6. That is, the first disc holder 11b supports the first optical disc 3a on the main side of the inner rotor 4 in which the opening 44a is formed and holds it by the opening wall 11 of the upper shell 6 not to sway horizontally.

As shown in FIG. 15, the second optical disc 3c, received in the disc receptacle 11a through the insertion/removal opening 2a, is rotatably held in the second disc holder 11c defined by the wall of the opening 44a formed in the inner rotor 4 and the shutter members 5a and 5b. That is, the second disc holder 11c supports the second optical disc 3c on the shutter members 5a and 5b exposed to outside through the opening 44a in the inner rotor 4 and holds it by the wall of the opening 44a not to sway horizontally.

The cartridge 1 according to the present invention, in which the first optical disc 3a or second optical disc 3c is inserted by the user, is loaded into the recorder/player.

Figure 18:
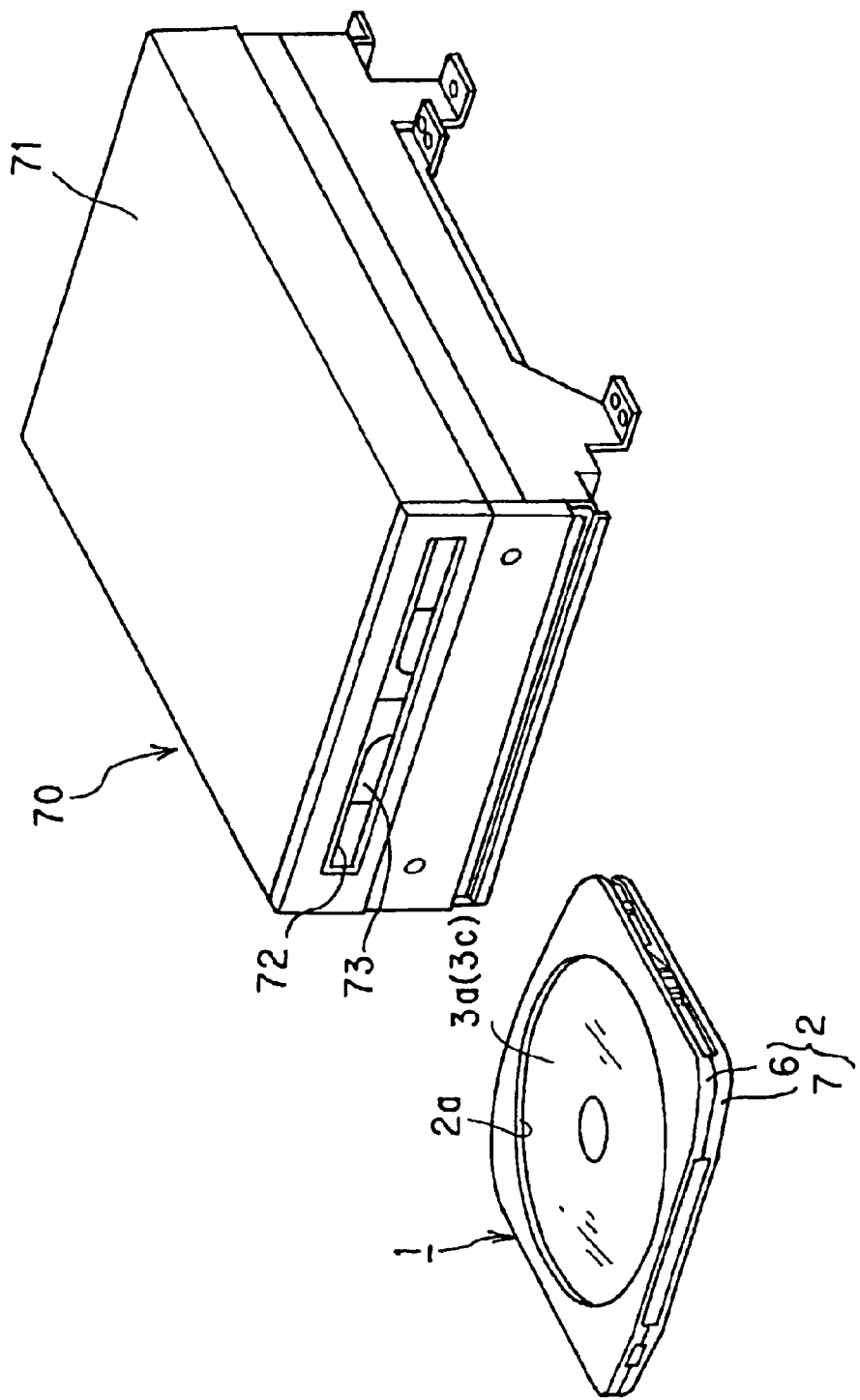
FIG. 18 is a perspective view of a recorder/player for use with the cartridge.

The cartridge 1 constructed as having been described in the foregoing is loaded in a disc recorder/player 70 shown in FIG. 18. The recorder/player 70 is constructed to receive a disc cartridge having received therein an optical disc equivalent in diameter to the first optical disc 3a. Different from the cartridge 1 according to the present invention, the disc cartridge has no disc insertion/removal opening formed in the upper shell thereof. The cartridge 1 according to the present invention can also be loaded in this recorder/player.

The recorder/player 70 will be explained herebelow with reference to FIG. 18. The recorder/player 70 includes a case 71 having disposed therein a main unit incorporating a loader for the cartridge 1 or disc cartridge. The case 71 has formed in the front side thereof a disc slot 72 through which the cartridge 1 or disc cartridge is to be inserted or ejected. The disc slot 72 is closed by a cover 73. When the cover 73 is pressed by the front end of the cartridge 1, it is pivoted inwardly to uncover the disc slot 72. Thus, the cartridge 1 can be introduced into the disc loader in the case 71.

Figure 19:
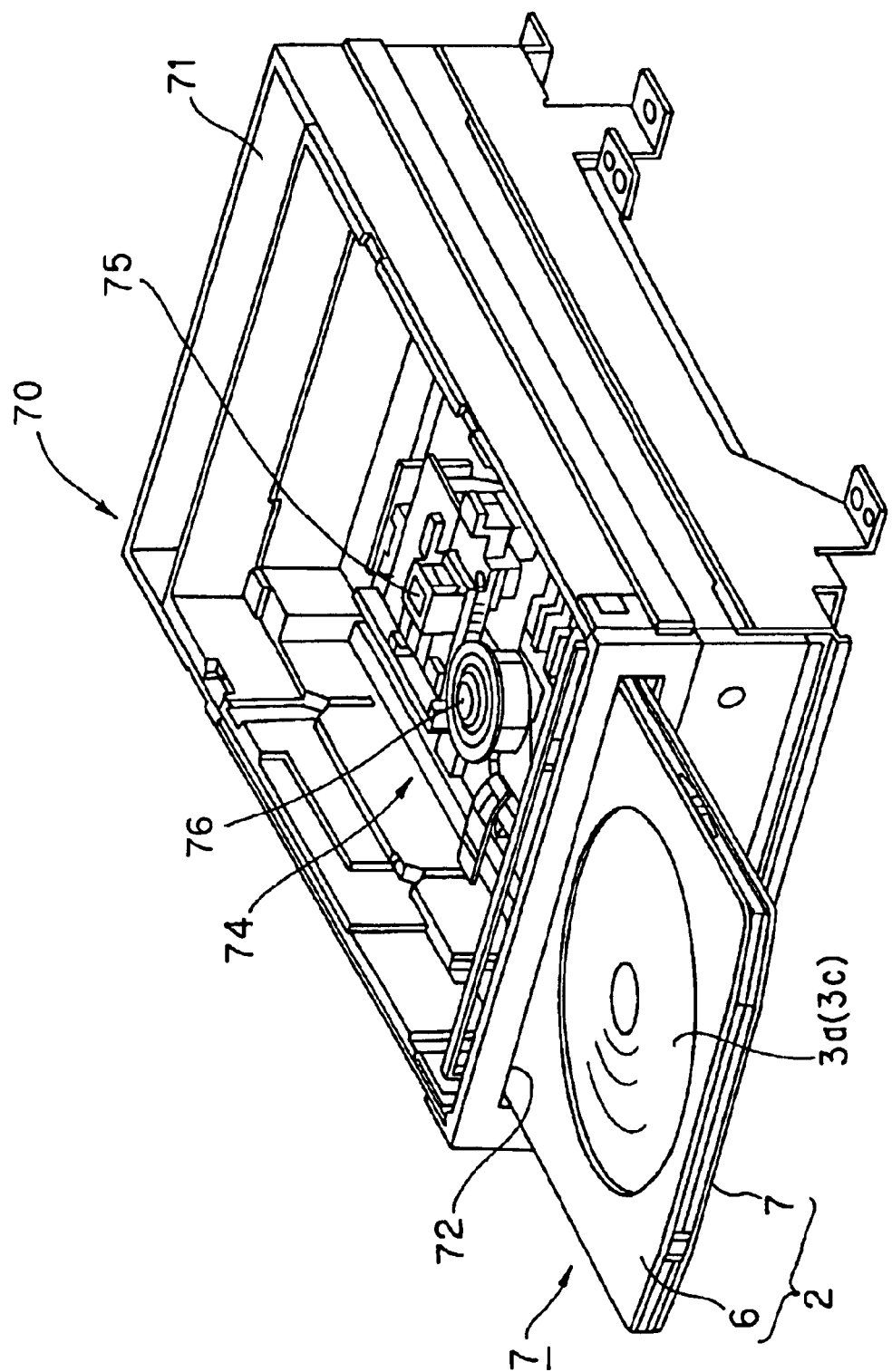
FIG. 19 is an explanatory perspective view of the loader provided in the disc recorder/player.

The main unit of the recorder/player 70, disposed inside the case 71, has a loading mechanism to load the cartridge 1 into the disc loader as shown in FIG. 19. The cartridge 1, having been inserted first at the front end thereof into the loading mechanism through the disc slot 72, is automatically pulled to the disc loader. The disc loader includes a disc rotation drive mechanism 74 to rotate the optical disc 3a or 3c at CLV (constant linear velocity), CAV (constant angular velocity) or at a combination of them, and optical pickup 75. The disc rotation drive mechanism 74 includes a disc table 76 installed to the drive shaft of a spindle motor rotatably with the drive shaft, a clamping plate to catch the optical disc 3a or 3c and rotate the optical disc along with the disc table 76, etc. When the cartridge 1 is inserted into place in the disc loader, the disc table 76 will be engaged in a central hole 3b or 3c of the optical disc 3a or 3c while holding the optical disc 3a or 3c in cooperation with the clamping plate. Once the spindle motor is put into run, the disc table 76 rotates the optical disc 3a or 3c at CLV or CAV.

The optical pickup 75 converges a light beam of about 400 nm in wavelength, emitted from a semiconductor laser, through an objective lens, focuses the light beam on the signal recording surface of the optical disc 3a or 3c to write information signal to the optical disc 3a or 3c and detects a return light reflected from the signal recording surface to read information signal from the optical disc 3a or 3c.

Figure 20:
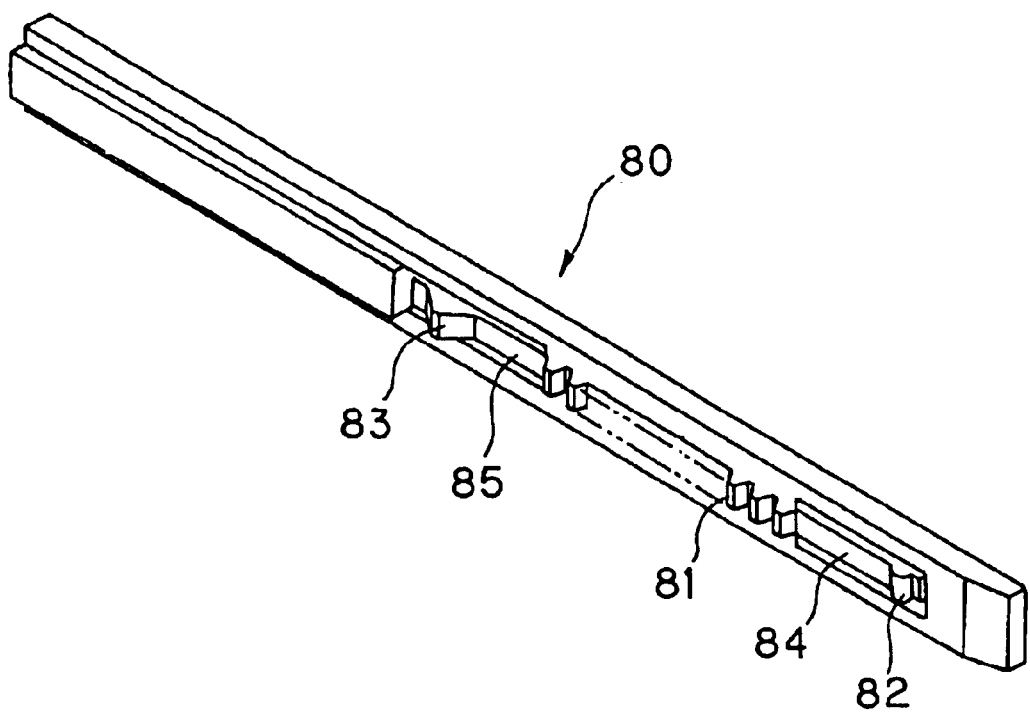
FIG. 20 is a perspective view of the shutter releasing member.

The disc loader in the recorder/player 70 includes a shutter releasing member 80 included in a shutter releasing mechanism which rotates the inner rotor 4 when the cartridge 1 is set in the disc loader and pivots the shutter members 5a and 5b. As shown in FIG. 20, the shutter releasing member 80 includes a rack 81 which is to be in mesh with the geared portion 45 of the inner rotor 4, a first engagement projection 82 provided at the end of the rack 81 for initial operation of the inner rotor 4, a second engagement projection 83 provided at the base of the track 81 for stopping the inner rotor 4, etc. The rack 81 has generally as many teeth as the geared portion 45 has.

The first engagement projection 82 is provided at the end of a first elastic member 84 provided at one end of the rack 81, and the second engagement projection 83 is provided at the end of a second elastic member 85 provided at the other end of the rack 81, such that they can positively be engaged in the engagement concavities 41 and 42, respectively, in the inner rotor 4. Such a shutter releasing member 80 may be adapted to move straight in relation to the cartridge 1 set in the disc loader and operate the shutter members 5a and 5b. Alternatively, the shutter releasing member 80 may be fixed to the main unit to operate the shutter members 5a and 5b as the cartridge 1 is moved to the disc loader.

Figure 21:
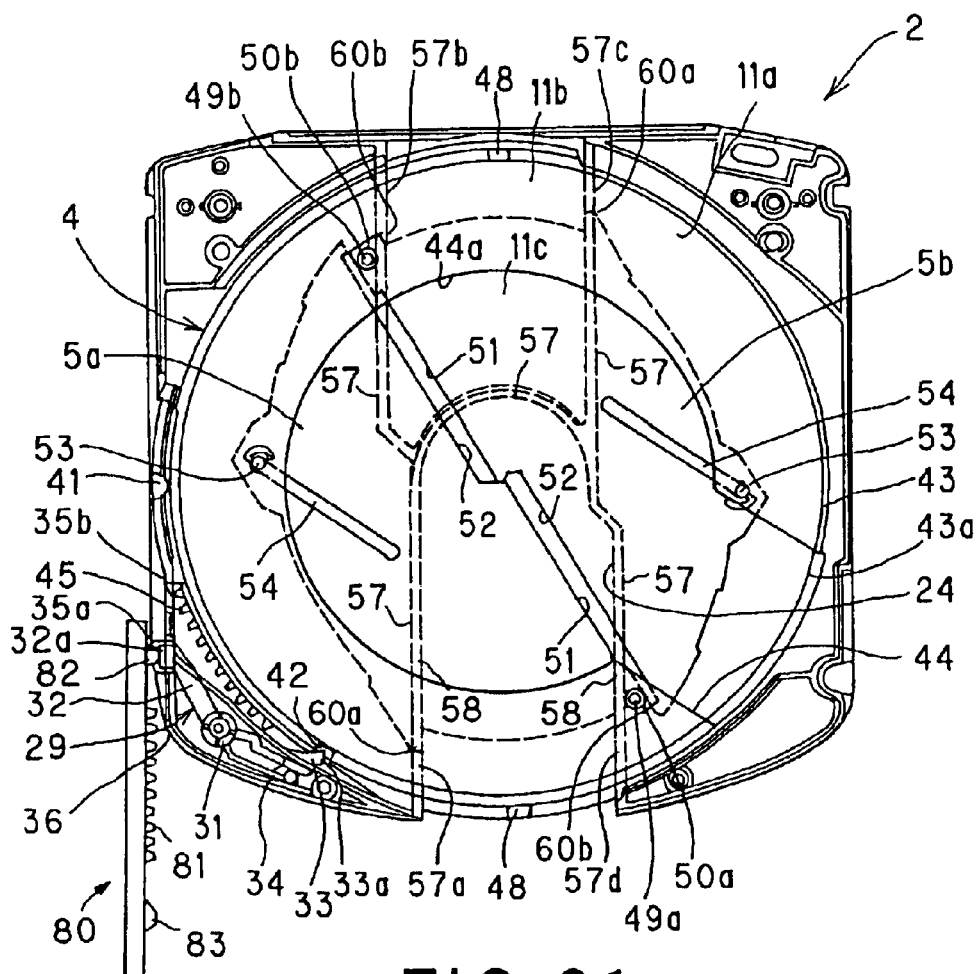
FIG. 21 is a plan view of the pair of shutter members being initially released.

The cartridge 1 is inserted into the disc slot 72 while pushing at the front end thereof the cover 73 as shown in FIG. 19. Once the cartridge 1 is inserted, the shutter members 5a and 5b are pressed by the cartridge 1 to start being released or opened. First, the shutter releasing member 80 is engaged in the guide recess 36 in the cartridge 1 and the first engagement projection 82 presses the opening projection 32a of the locking member 29, accessible from outside through the locking opening 35a formed in the guide recess 36, as shown in FIG. 21. Thus, the locking member 29 pivots about the pivot 25 and stop projection 33a is disengaged from the second engagement concavity 42 in the inner rotor 4. As a result, the inner rotor 4 is unlocked and thus enabled to rotate.

Figure 22:
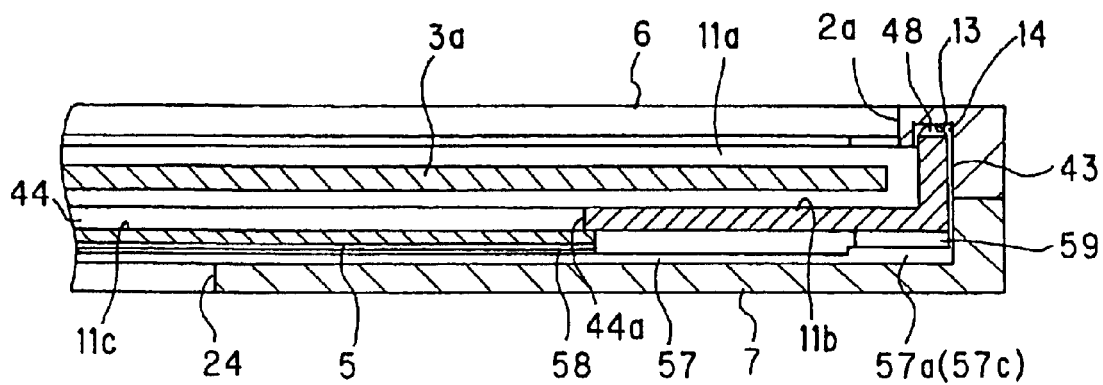
FIG. 22 is a segmentary sectional view of the cartridge, showing that the lift-up projections of the inner rotor are disengaged from those of the upper shell.
Figure 23:
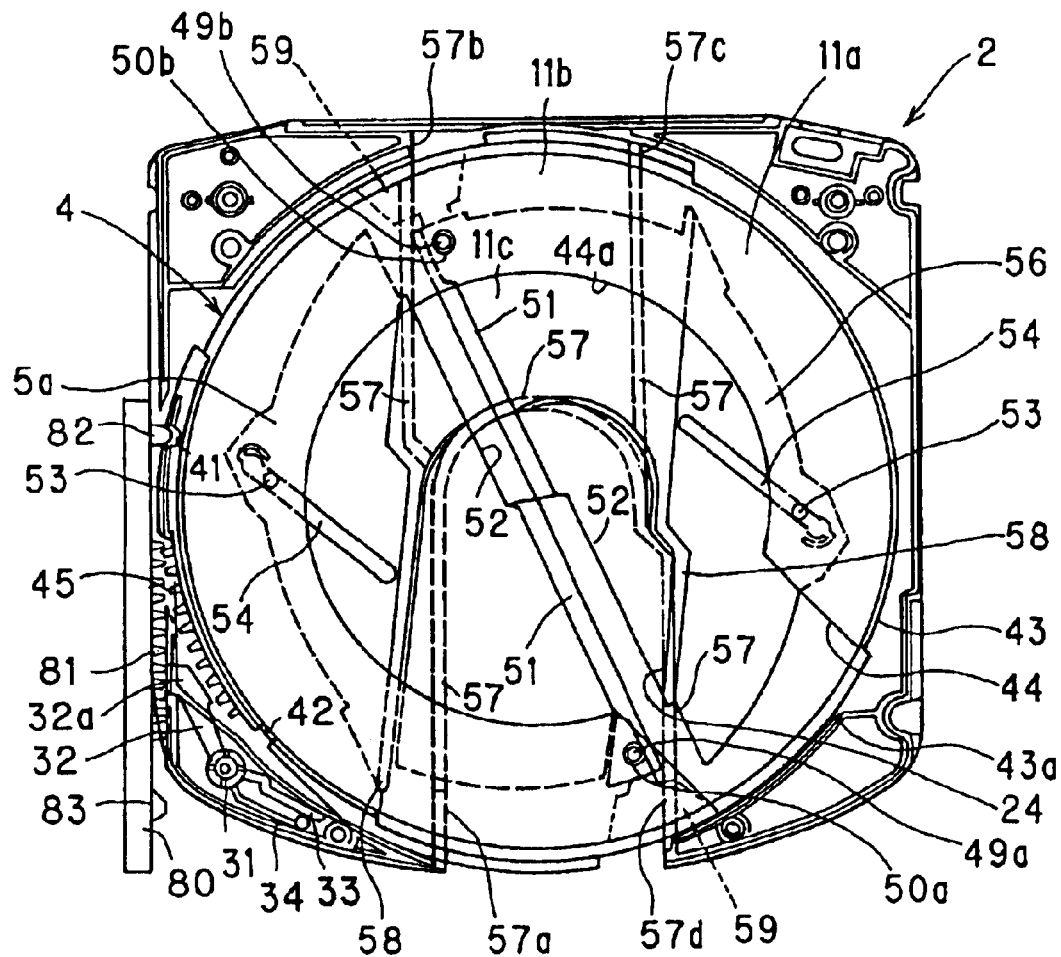
FIG. 23 is a plan view of the pair of shutter members with the rack of the shutter releasing member being engaged with the gear of the inner rotor.

When the shutter releasing member 80 further moves ahead of the cartridge 1, the rack 81 will continuously press the operating projection 32a of the locking member 29, thereby keeping the inner rotor 4 unlocked. As shown in FIG. 23, the first engagement projection 82 is engaged in the first engagement concavity 41 exposed to outside through the inner rotor access opening 35b of the inner rotor 4 to put the inner rotor 4 in a ready state for rotation. The shutter releasing member 80 further moves ahead of the cartridge 1 to pivot the inner rotor 4. At this time, the lift-up projections 14 and 48 are disengaged from each other as shown in FIG. 22 and thus the friction is reduced, and hence the inner rotor 4 can smoothly be rotated with a small force. The rack 81 of the shutter releasing member 80 is put in mesh with the geared portion 45 exposed to outside through the inner rotor access opening 35b as shown in FIG. 23.

Figure 24:
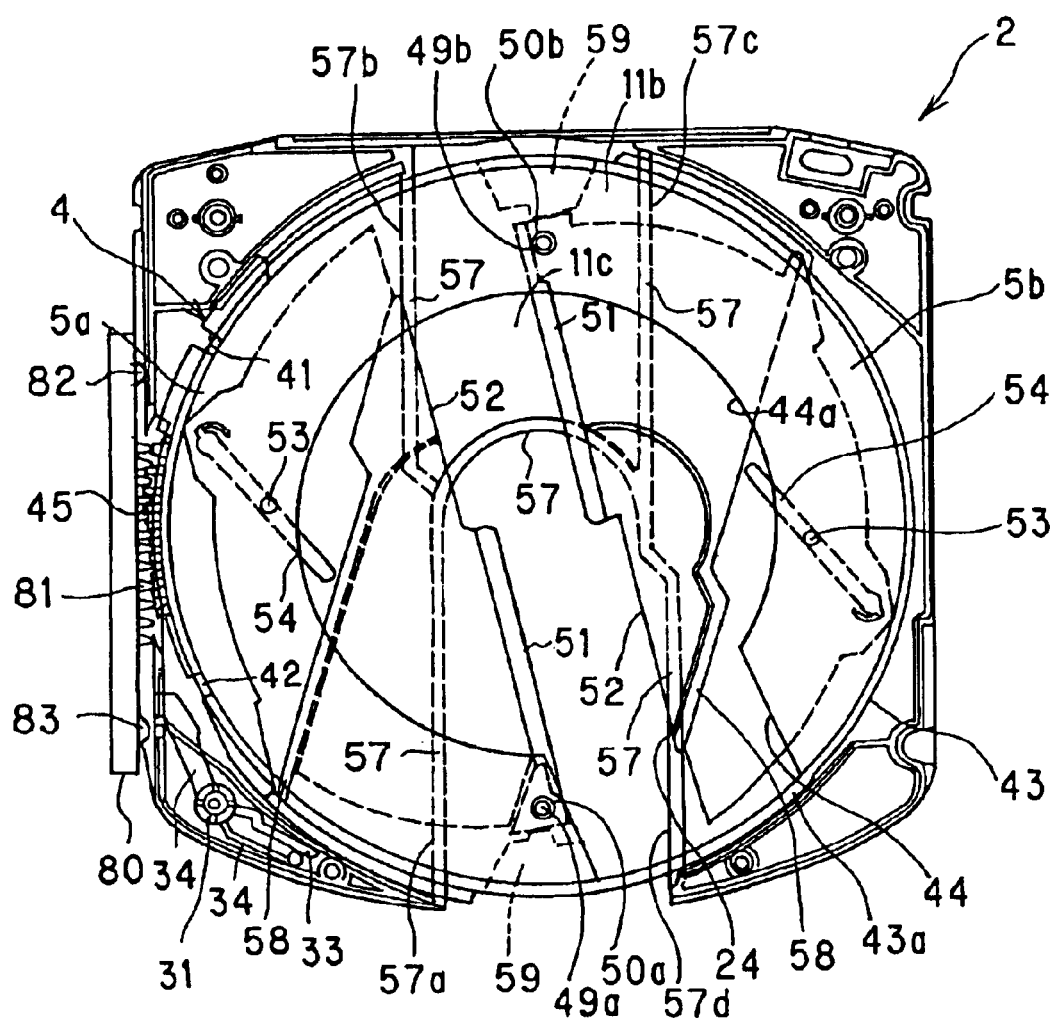
FIG. 24 is a plan view of the pair of shutter members in process of uncovering the opening.
Figure 25:
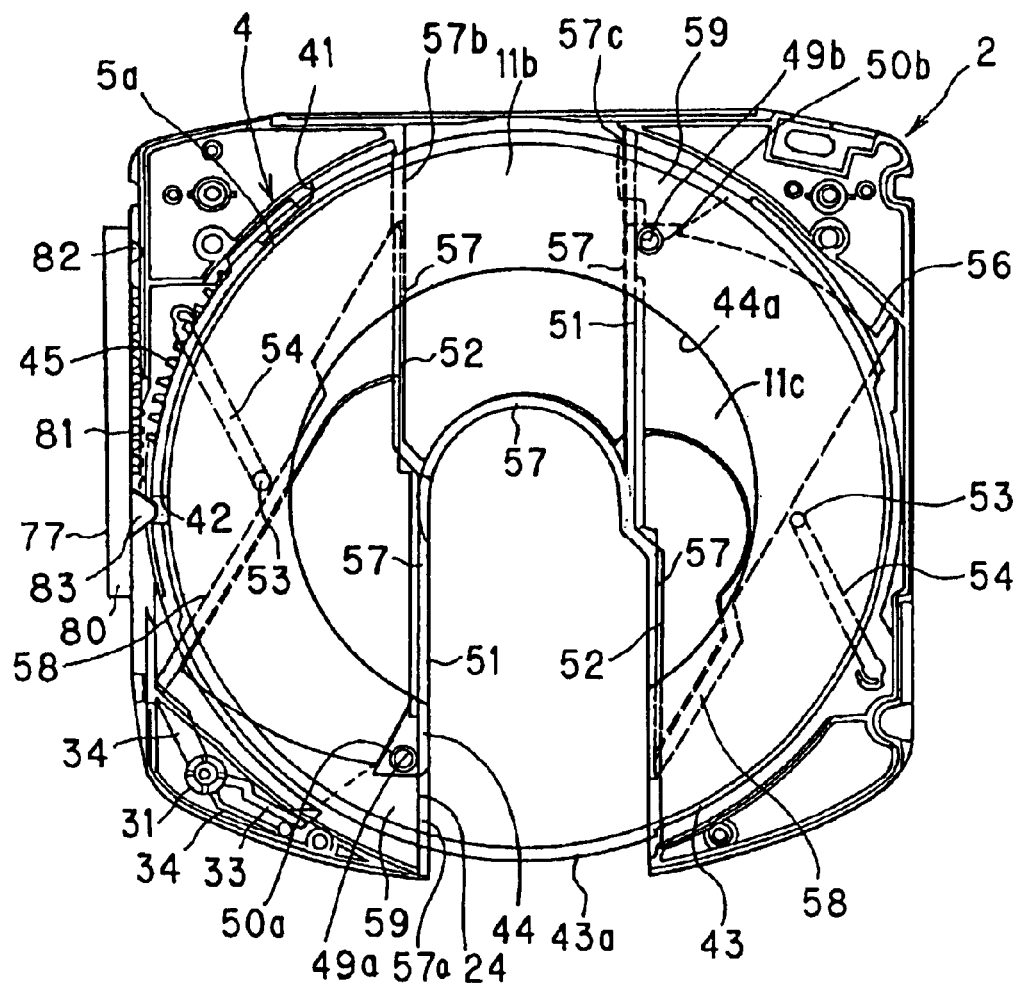
FIG. 25 is a plan view of the pair of shutter members having fully uncovered the opening.

Having further moved ahead of the cartridge 1, the shutter releasing member 80 having the rack 81 thereof in mesh with the geared portion 45 of the inner rotor 4 rotates the inner rotor 4 as shown in FIG. 24. Thus, the guide pin 53 of the inner rotor 4 is engaged in the guide hole 54 so that the shutter members 5a and 5b pivoted to the pivots 49a and 49b, respectively, will pivot in a direction of uncovering the openings 24 and 44. When the rack 81 of the shutter releasing member 80 is disengaged from the geared portion 45 of the inner rotor 4, the shutter members 5a and 5b stop pivoting as shown in FIG. 25, and then the second engagement projection 83 of the shutter releasing member 80 is engaged in the second engagement concavity 42 of the inner rotor 4. Thus, the shutter members 5a and 5b are kept to fully uncover the openings 24 and 44.

Thereafter, the disc table 76 included in the disc rotation drive mechanism 74 enters through the opening 24b, is engaged into the central hole 3b or 3d of the optical disc 3a or 3c and cooperates with the clamping plate to clamp the optical disc 3a or 3c rotatably. Also, the optical pickup 75 enters through the opening 24a. Thus, the optical disc 3a or 3c is rotated by the disc rotation drive mechanism 74. A light beam is projected from the optical pickup 75 to the optical disc 3a or 3c at the signal recording surface thereof for writing information signal to the optical disc 3a or 3c. A return light reflected from the signal recording surface is detected for reading information signal from the optical disc 3a or 3c.

On the other hand, to remove the cartridge 1 from inside the recorder/player 70, the user operates the eject button included in a control unit, for example, provided on the recorder/player. Thus, the loading mechanism ejects the cartridge 1. The cartridge 1 will move to the disc slot 72, while the aforementioned shutter releasing member 80 will correspondingly retreat in relation to the cartridge 1. Along with the retreat of the shutter releasing member 80, the inner rotor 4 and pair of shutter members 5a and 5b will reversely take the steps they have taken for inserting the optical disc.

That is, the inner rotor 4 will rotate reversely and the pair of shutter members 5a and 5b will cover the openings 24 and 44 in the cartridge body 2.

The cartridge 1 permits the user to freely replace the optical discs 3a and 3c through the disc insertion/removal opening 2a formed in the main side of the upper shell 6. Since the cartridge 1 receives the optical disc 3a or 3c through the insertion/removal opening 2a with the signal recording surface directed down oppositely to the insertion/removal opening 2a, it is possible to prevent any fingerprint or the like from adhering to the signal recording surface of the optical disc 3a or 3c being handled. The cartridge 1 permits to use the optical disc 3a or 3c normally used, not encased in any cartridge or the like, in a recorder/player 70 dedicated for a disc cartridge having an optical disc encased therein in advance. Since the cartridge 1 can be produced following almost same manufacturing procedure for a disc cartridge, it can be manufactured in a disc cartridge production line.

Figure 26:
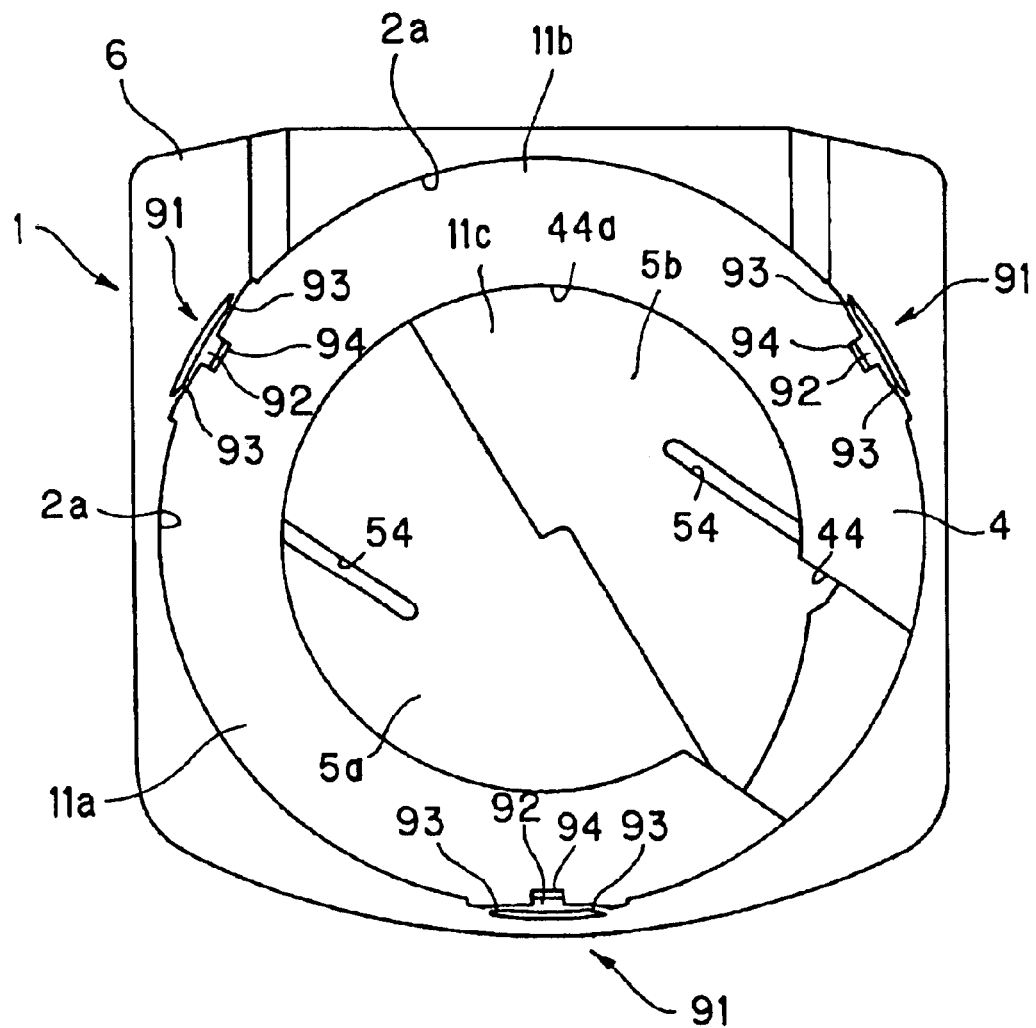
FIG. 26 is a plan view of the cartridge with the optical disc come-off preventive mechanisms provided around the optical disc insertion/removal opening.
Figure 27:
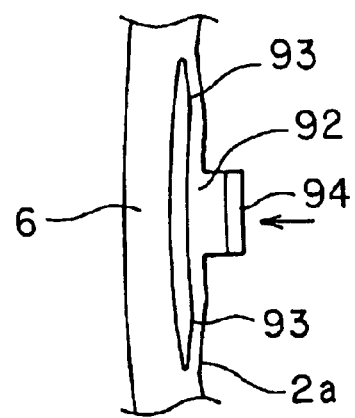
FIG. 27 is a segmentary plan view of the come-off preventive mechanism.

Note that as shown in FIG. 26, a come-off preventive mechanism 91 may be provided in a plurality of places around the insertion/removal opening 2a of the upper shell 6 included in the cartridge 1 to prevent the first optical disc 3a held in the first disc holder 11b from coming off. The come-off preventive mechanism 91 is provided in three places around the insertion/removal opening 2a. Each of the come-off preventive mechanisms 91 is formed integrally with the opening wall 11 as shown in FIG. 27 to avoid an increased number of cartridge parts. The come-off preventive mechanism 91 includes a come-off preventive piece 92 to prevent the first optical disc 3a from coming off the first disc holder 11b, and elastically flexible pieces 93 to couple the come-off preventive piece 92 and opening wall 11 with each other. The come-off preventive piece 92 is provided projecting toward the perimeter of the insertion/removal opening 2a to catch the perimeter of the first optical disc 3a held in the first disc holder 11b. The end top of the come-off preventive piece 92 is tapered, and an insertion guide 94 is provided on the end top to guide the first optical disc 3a being inserted into the disc receptacle 11a. The two elastically flexible pieces 93 are provided across the come-off preventive piece 92 to couple the latter to the opening wall 11. When inserting the first optical disc 3a, the elastically flexible pieces 93 will be moved outwardly of the disc receptacle 11a and the come-off preventive piece 92 move toward the perimeter of the insertion/removal opening 2a, thus permitting to receive the first optical disc 3a in the disc receptacle 11a.

Figure 28:
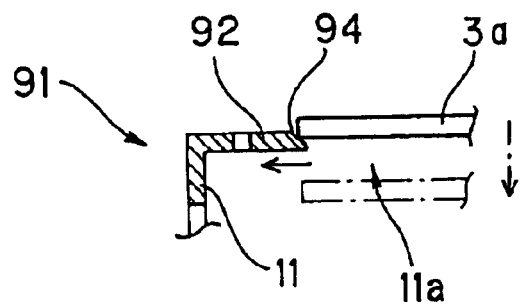
FIG. 28 is a segmentary sectional view of the come-off preventive mechanism.

As shown in FIG. 28, when the insertion guide 94 is pressed by the perimeter of the first optical disc 3a being inserted, the elastically flexible pieces 93 are moved and thus the come-off preventive piece 92 is provisionally moved toward the perimeter of the insertion/removal opening 2a against the elasticity of the elastically flexible pieces 93. Thus, the first optical disc 3a can be received into the disc receptacle 11a.

Note that the optical disc 3a or 3c will possibly have the signal recording surface thereof stained and/or damaged if it is repeatedly inserted into, and removed from, the cartridge 1. To prevent the optical disc from being stained and/or damaged at the signal recording surface thereof due to such repeated insertion and removal, the optical disc 3a or 3c once received in the disc receptacle 11a should desirably be not easily removable from the cartridge 1. To this end, the come-off preventive mechanism 91 to prevent at least the first optical disc 3a from coming off is constructed as follows. Namely, its end top is tapered as the insertion guide 94 and its surface for catching the first optical disc 3a is made flat in parallel to the optical disc 3a, so that once the first optical disc 3a is received in the disc receptacle 11a, the come-off preventive piece 92 will not easily be movable toward the perimeter of the insertion/removal opening 2a against the elasticity of the elastically flexible pieces 93 and thus the first optical disc 3a cannot easily be taken out of the disc receptacle 11a.

Note that in the foregoing, the present invention has been explained concerning the embodiment thereof provided with the three come-off preventive mechanisms 91 but the come-off preventive mechanism 91 may be provided in one place, or in a plurality of places to prevent the optical disc 3a more positively from coming off.

Figure 29:
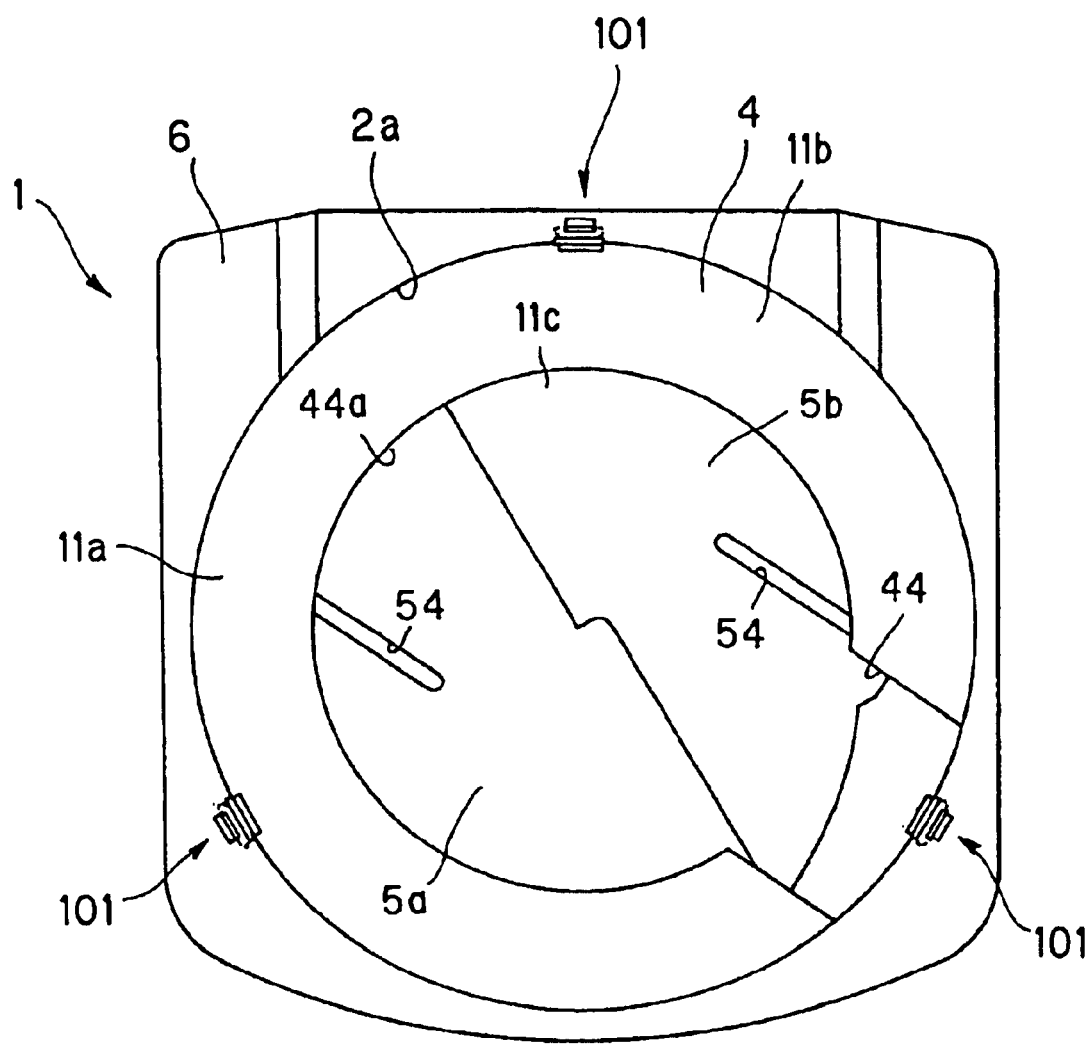
FIG. 29 is a plan view of the cartridge with the optical disc come-off preventive mechanisms provided around the optical disc insertion/removal opening.
Figure 30:
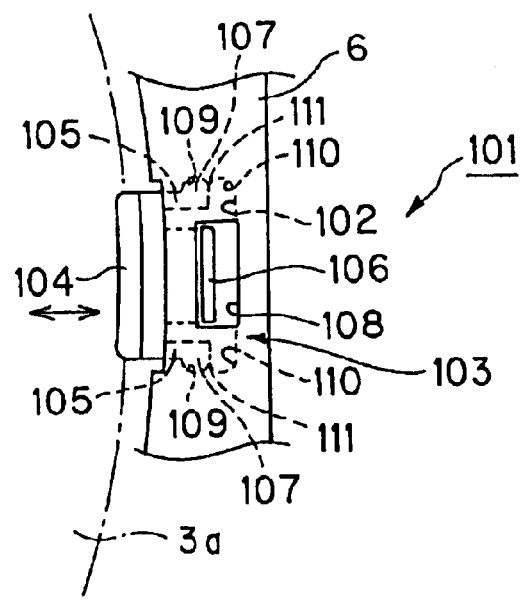
FIG. 30 is a segmentary plan view of the come-off preventive mechanism.
Figure 31:
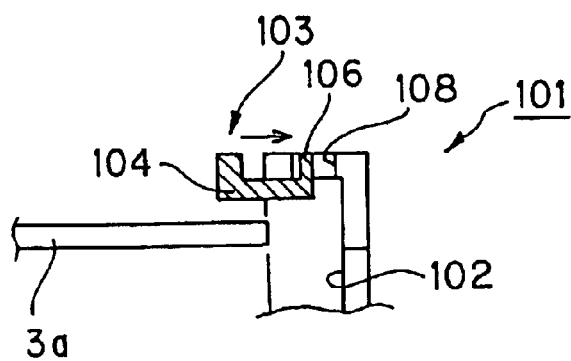
FIG. 31 is a segmentary sectional view of the come-off preventive mechanism.

The come-off preventive mechanism for the first optical disc 3a received in the disc receptacle 11a may be adapted as shown in FIGS. 29 to 31. As shown, the come-off preventive mechanism generally indicated with a reference 101 is provided in three places around the insertion/removal opening 2a. Each of the come-off preventing mechanisms 101 includes a receiver 102 formed in the wall of the insertion/removal opening 2a and a come-off preventive member 103 received in the receiver 102.

The come-off preventive member 103 is composed of a come-off preventive piece 104 to catch the perimeter of the first optical disc 3a held in the first disc holder 11b of the disc receptacle 11a and thus prevent the first optical disc 3a from coming off the disc receptacle 11a, elastically flexible pieces 105 to limit the movement of the come-off preventive member 103, and an operating piece 106 to operate the come-off preventive member 103. The elastically flexible pieces 105 are formed to elastically move inwardly, and each of them has an engagement portion 107 provided on the free end thereof.

The receiver 102 to receive the come-off preventive member 103 is formed to such a size that the come-off preventive piece 104 projects toward the insertion/removal opening 2a and can be moved between a come-off preventive position in which it catches the perimeter of the first optical disc 3a held in the first disc holder 11b of the disc receptacle 11a and a disc insertion/removal position where the come-off preventive piece 104 retreats from the insertion/removal opening 2a and the first optical disc 3a can be inserted or removed. The come-off preventive member 103 received in the receiver 102 has the operating piece 106 thereof exposed to outside through an access hole 108 formed in the upper shell 6. The engagement portion 107 of each elastically flexible piece 105 is selectively engaged in either a first engagement concavity 109 or second engagement concavity 110 formed in the receiver 102. Between the first and second engagement concavities 109 and 110, there is provided a projection 111 which clicks when overridden by the engagement portion 107.

In the come-off preventive mechanism 101, when the first optical disc 3a is inserted into, or removed from, the cartridge 1, the operating piece 106 exposed to outside through the access hole 108 is moved toward the wall of the insertion/removal opening 2a for engagement of the engagement portion 107 into the second engagement concavity 110. Thus, the come-off preventive member 103 is held in the insertion/removal position where the come-off preventive piece 104 has retreated from the insertion/removal opening 2a and the optical disc 3a can be inserted or removed. Namely, the first optical disc 3a can be inserted into, or removed from, the cartridge 1. Once the optical disc 3a is inserted into the disc receptacle 11a, when the operating piece 106 exposed to outside through the access hole 108 is moved toward the insertion/removal opening 2a, the engagement portion 107 moves from the second engagement concavity 110 to the first engagement concavity 109. When overriding the projection 111, the engagement portion 107 will click. When the engagement portion 107 is engaged in the first engagement concavity 109, the come-off preventive member 103 is held in the come-off preventive position where the come-off preventive piece 104 projects toward the insertion/removal opening 2a.

In case the come-off preventive mechanism 101 is provided in a plurality of places so that even if one of the come-off preventive members 103 is moved erroneously to the disc insertion/removal position, the other come-off preventive members 103 will stay in their respective come-off preventive positions, it is possible to prevent the first optical disc 3a from erroneously coming off the disc receptacle 11a.

Figure 32:
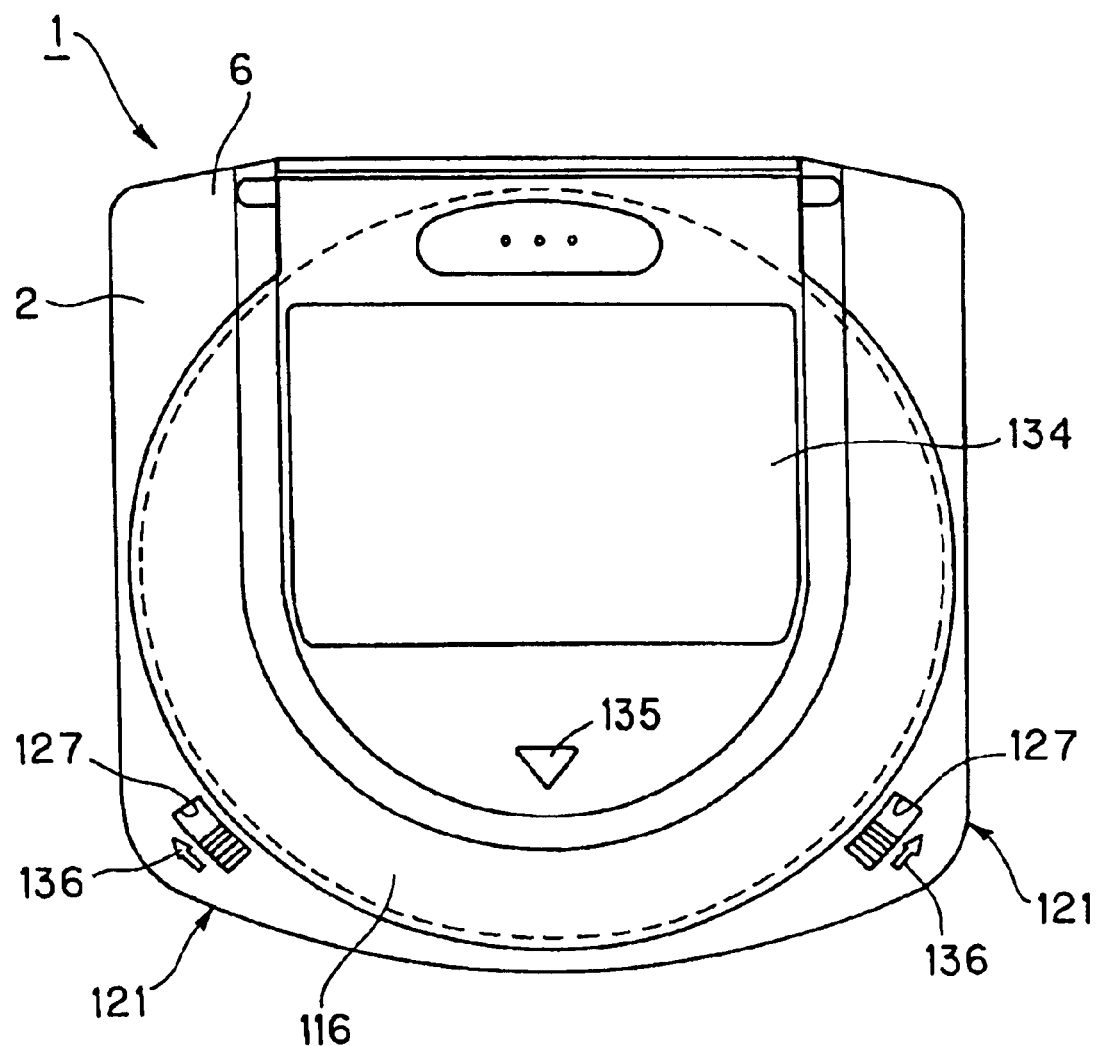
FIG. 32 is a plan view of the cartridge provided with a cover.
Figure 33:
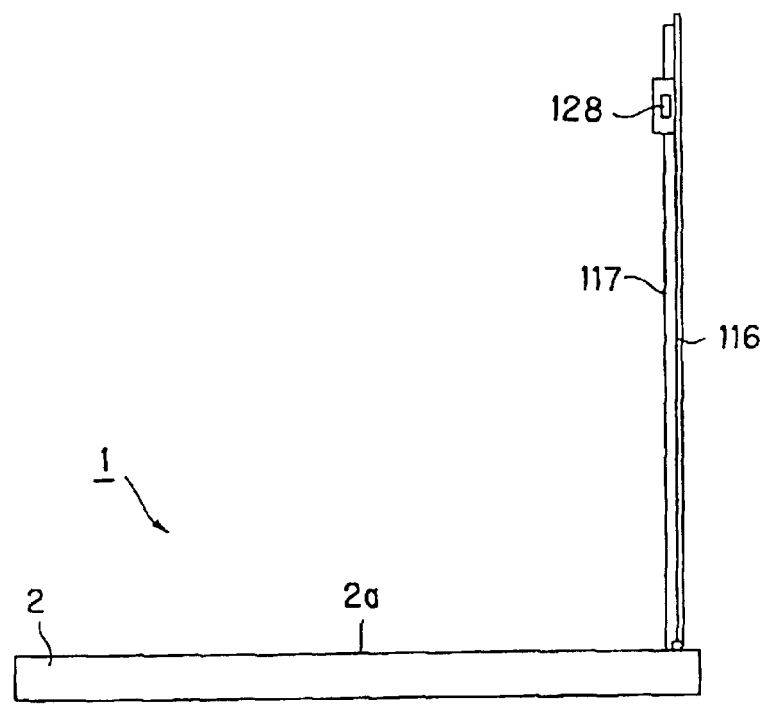
FIG. 33 is a side elevation of the cartridge with the optical disc insertion/removal opening being uncovered with the cover opened.
Figure 34:
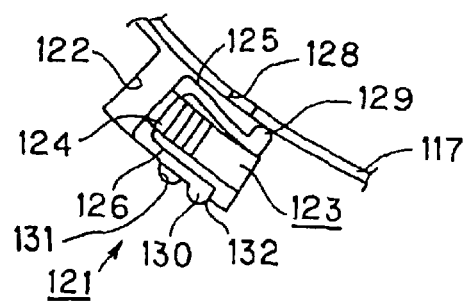
FIG. 34 is a segmentary plan view of the locking mechanism in a position where it locks the cover.

The cartridge 1 may have provided on the cartridge body 2 thereof a cover which covers the disc insertion/removal opening 2a to prevent the first or second optical disc 3a or 3c received in the disc receptacle 11a from coming off. More specifically, the upper shell 6 of the cartridge body 2 has a cover 116 installed thereon as shown in FIGS. 32 and 33. The cover 116 is formed to have a generally same size as the insertion/removal opening 2a and has a rising wall 117 provided along the perimeter thereof. Such a cover 116 is pivoted to a pivot 118 provided at the rear side of the cartridge body 2, and thus it is supported pivotally on the cartridge body 2. When the cover 116 covers the insertion/removal opening 2a, the opening wall 11 and rising wall 117 overlap each other, whereby any foreign matter such as dust will not easily enter the disc receptacle 11a. The cover 116 may be adapted to be forced by an forcing means such as a spring in a direction of uncovering the insertion/removal opening 2a. Since the cover 116 covers the insertion/removal opening 2a, it is possible to prevent the optical disc, 3a or 3c, once received in the disc receptacle 11a from coming off there.

Note that the cover 116 may has a window 134 which permits to view the optical disc 3a or 3c in the disc receptacle 11a through it. Also, there may be provided on the cover 116 a marking 135 such as an arrow to indicate the direction of insertion of the cartridge 1 into the recorder/player 70.

As shown in FIGS. 32 to 35, the cartridge 1 has a locking mechanism 121 to hold the cover 116 in a position where it covers the insertion/removal opening 2a. The locking mechanism 121 is provided in two places around the insertion/removal opening 2a. Each of these locking mechanisms 121 includes a receiver 122 formed in the wall of the insertion/removal opening 2a and an operating member 123 received in the receiver 122 to open and close the cover 116.

The cover operating member 123 consists of a tab 124 operable by the user, a first elastically flexible piece 125 to lock the cover 116, and a second elastically flexible piece 126 to hold the operating member 123 in a predetermined position.

The tab 124 is exposed to outside through a generally rectangular access hole 127 formed in the top of the upper shell 6. Also, the first elastically flexible piece 125 has formed at the end thereof a locking portion 129 which is engaged in an engagement hole 128 formed in the rising wall 117 of the cover 116. Also, the second elastically flexible piece 126 has an engagement portion 130 formed at the end thereof. The engagement portion 130 is selectively engaged in a first engagement concavity 131 destined for holding the operating member 123 provided in the receiver 122 in a locking position where the locking portion 129 is engaged in the engagement hole 128, and a second engagement concavity 132 destined for holding the operating member 123 in an unlocking position where the locking portion 129 having unlocked the cover 116 is not engaged in the engagement hole 128. Between the first and second engagement concavities 131 and 132, there is provided a projection 133 which clicks when it is overridden by the engagement portion 130.

Figure 35:
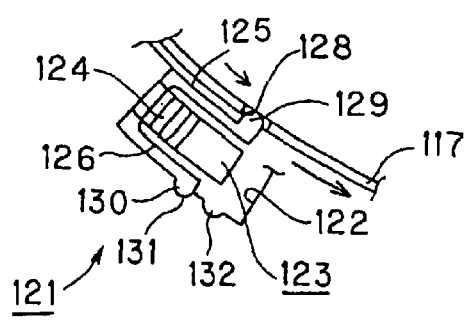
FIG. 35 is a segmentary plan view of the locking mechanism in a position where it unlocks the cover.

When the cover 116 is being locked to cover the insertion/removal opening 2a, the locking portion 129 of the first elastically flexible piece 125 is engaged in the engagement hole 128 in the rising wall 117 of the cover 116, while the engagement portion 130 of the second elastically flexible piece 126 is engaged in the first engagement concavity 131 to hold the operating member 123 in the locking position, as shown in FIG. 35. When the tab 124 exposed to outside through the access hole 127 is moved in the direction of arrow in FIG. 34 in order to unlock the cover 116, the engagement portion 130 overrides the projection 133 against the elasticity of the second elastically flexible piece 126 and gets engaged into the second engagement concavity 132, while the first elastically flexible piece 125 is moved toward the tab 124 and the locking portion 129 gets disengaged from the engagement hole 128. At this time, the engagement portion 130 overrides the projection 133 to click. Thus, the user can know that the operating member 123 has been moved from one to another position.

The locking mechanism 121 can be provided in a plurality of places such that even when one of the operating members 123 is erroneously moved from the locking position to the unlocking position, the other operating members 123 will stay in their respective locking positions to prevent the cover 116 from wrongly uncovering the insertion/removal opening 2a, and thus the optical disc 3a or 3c will not come off the disc receptacle 11a. Near the access hole 127, there may be provided a marking 136 indicating a direction of moving the operating member 123 for locking the cover 116, for example. The direction of moving the operating member 123 may be opposite to a one shown herein.

Figure 36:
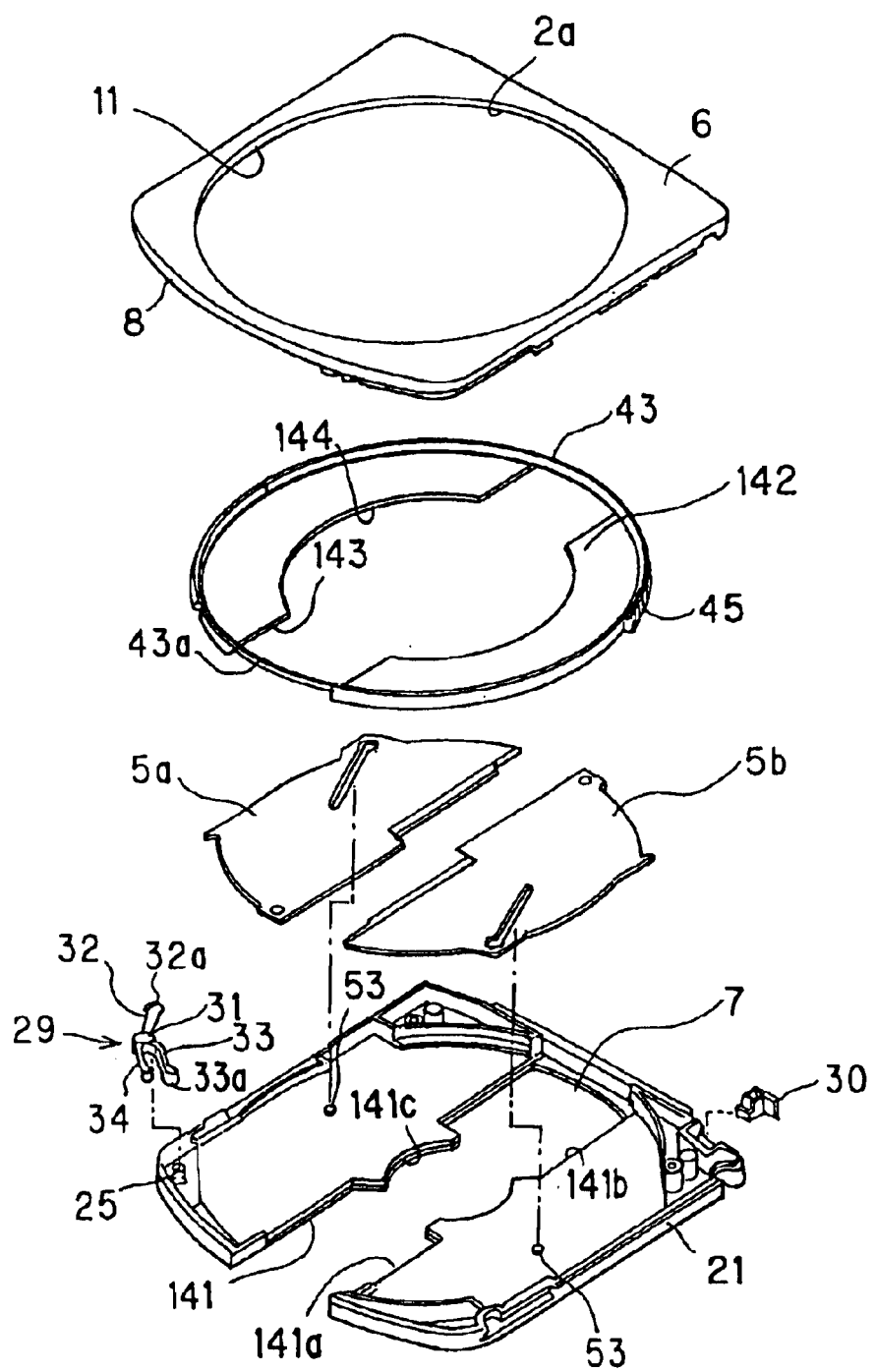
FIG. 36 is an exploded perspective view of a variant of the cartridge according to the present invention.
Figure 37:
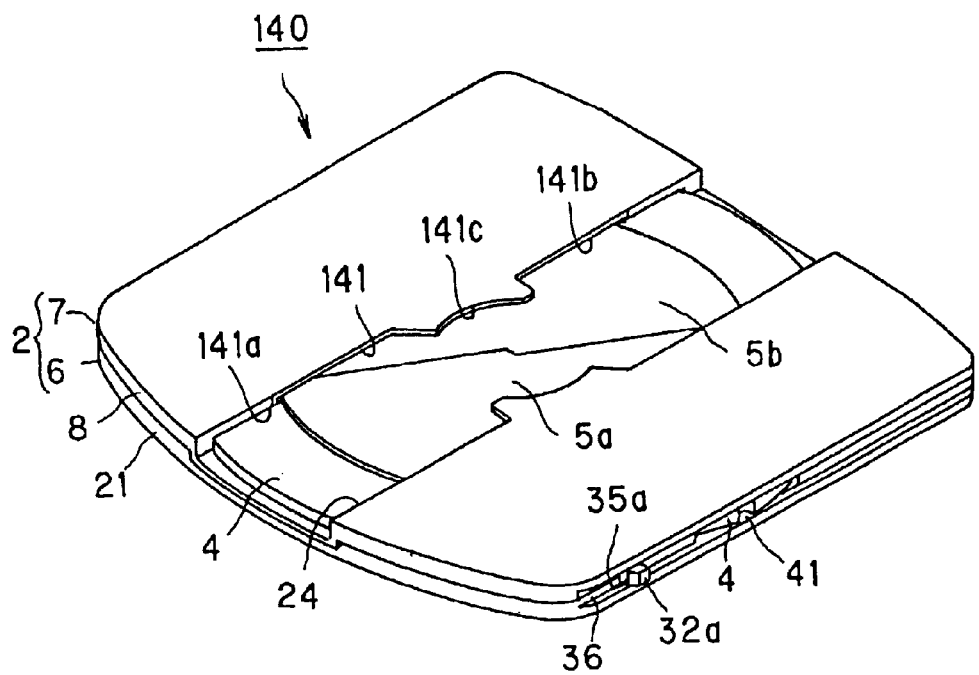
FIG. 37 is a perspective view, from below, of the cartridge in FIG. 36.
Figure 38:
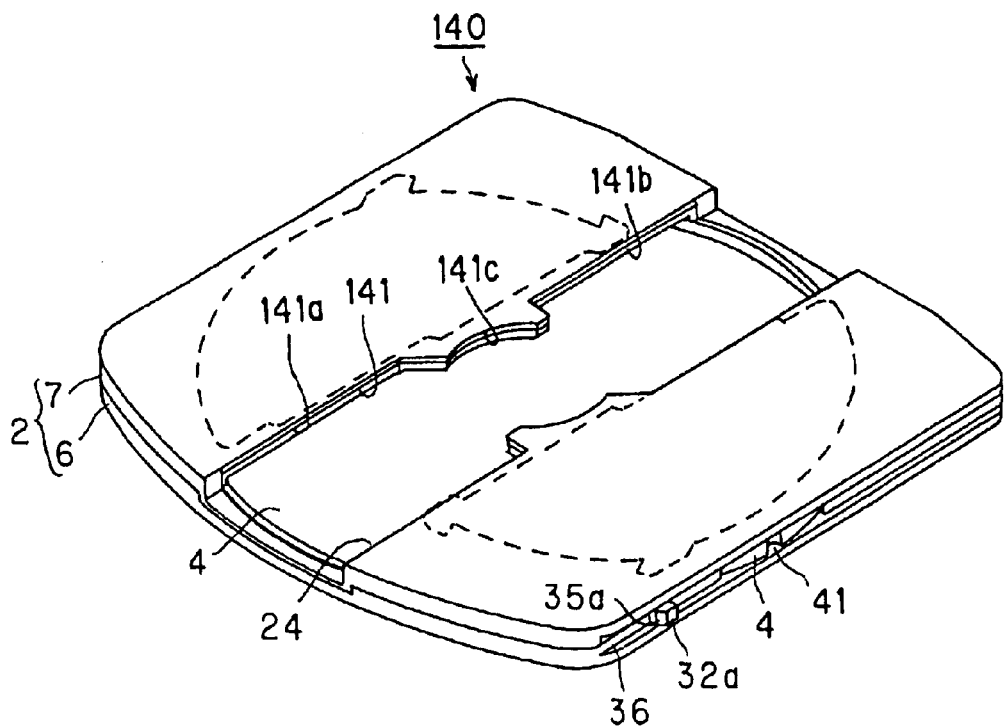
FIG. 38 is a perspective view of the cartridge in FIG. 36 with the pair of shutter members being released to uncover the opening.

In the above embodiment, the opening 24 is formed to extend from the front toward the center of the cartridge body 2. However, the present invention can be applied to a cartridge 140 shown in FIGS. 36 to 38. The cartridge 140 has formed therein an opening 141 extending generally in parallel to the direction of insertion into the recorder/player 70 from the front to the rear thereof. More specifically, the opening 141 is formed in the bottom of the cartridge 1 to have a generally rectangular shape extending from near the front center to near the rear center. The front and rear portions of the opening 141 are used as write/read openings 141a and 141b the optical pickup enters, and the central portion of the opening 141 is used as a drive opening 141c the disc rotation drive mechanism enters. The cartridge 140 has provided therein an inner rotor 142 having formed therein an opening 143 corresponding to the opening 141 and having a generally same radial size as the opening 141. The opening 143 has, near the center thereof, an opening 144 which holds the second optical disc 3c. It should be noted that the other construction of this cartridge 140 is common to that of the aforementioned cartridge 1 and so will not be explained in detail. Also note that the same or similar elements of this cartridge 140 as or to those of the aforementioned cartridge 1 will be indicated with the same or similar references.

The cartridge 140 has formed therein the disc receptacle 11a into which the first optical disc 3a of the standard size or the second optical disc 3c whose diameter is smaller than that of the first optical disc 3a is inserted through the insertion/removal opening 2a formed in the upper shell 6. The first optical disc 3a received in the disc receptacle 11a through the insertion/removal opening 2a will be rotatably held in the first disc holder 11b defined by the main side of the inner rotor 142 in which the openings 143 and 144 are formed and the opening wall 11. More particularly, the first disc holder 11b supports the first optical disc 3a on the main side thereof in which the openings 143 and 144 are formed and holds it by the opening wall 11 not to sway horizontally.

The second optical disc 3c received in the disc receptacle 11a through the insertion/removal opening 2a will be rotatably held in the second disc holder 11c defined by the wall of the opening 144 formed in the main side of the inner rotor 142 and the shutter members 5a and 5b. More particularly, the second disc holder 11c supports the second optical disc 3c on the shutter members 5a and 5b exposed to outside through the opening 144 in the inner rotor 142 and holds it by the wall of the opening 144 not to sway horizontally.

In the cartridge 140 loaded in the recorder/player, the shutter members 5a and 5b are opened by the shutter releasing mechanism of the recorder/player, thus the opening 141 is uncovered and the optical disc 3a or 3c is exposed to outside. Then the optical disc 3a or 3c is clamped and rotated by the disc rotation drive mechanism in the recorder/player, having entered the cartridge 1 through the opening 141c. Also, the optical pickup enters the opening 141a or 141b. Projecting a light beam to the optical disc 3a or 3c, the optical pickup writes information signal to the optical disc 3a or 3c, projects a light beam to the optical disc 3a or 3c. Detecting a return light reflected from the signal recording surface of the optical disc 3a or 3c, the optical pickup reads information signal from the optical disc 3a or 3c. Since the cartridge 140 allows to use two optical pickups for write and read of information signal, it will make it possible to write and read information signal in a reduced length of time.

Figure 39:
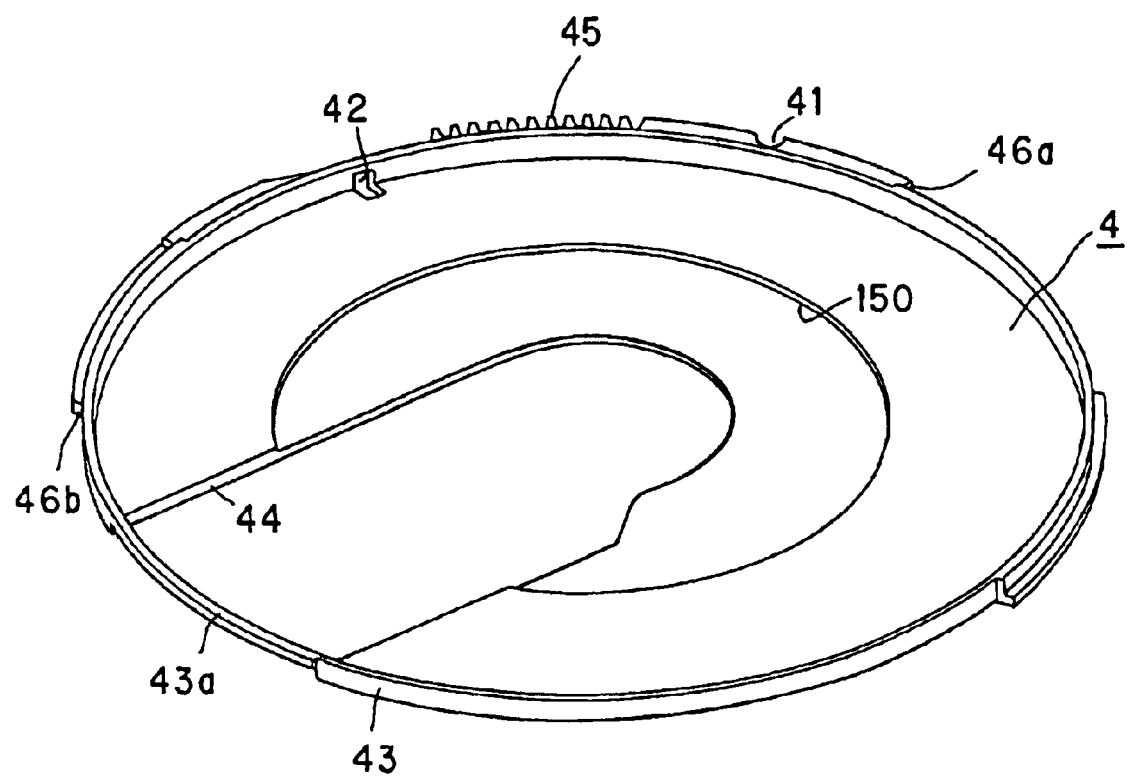
FIG. 39 is a perspective view of a variant of the inner rotor.

In the foregoing, there has been described a variant of the cartridge having the opening 44a formed in the inner rotor 4 and defining the second disc holder 11c in which the second optical disc 3c is held. However, the inner rotor 4 may have the second disc holder 11c defined by a concavity. More specifically, the inner rotor 4 has formed in the main side thereof at the side of the upper shell 6 a second disc holder 150 defined by a generally circular concavity to hold the second optical disc 3c, as shown in FIG. 39. The concavity defining the second disc holder 150 is formed to have a somewhat larger size than that of the second optical disc 3c for smooth insertion and removal of the second optical disc 3c. It should be noted that the other construction of the inner rotor 4 in this cartridge is the same as that of the aforementioned inner rotor 4 and so will not be explained in detail.

Figure 40:
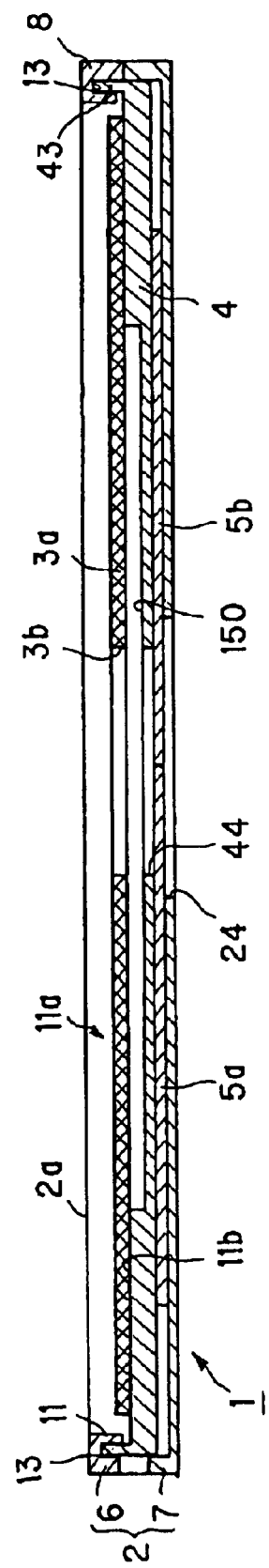
FIG. 40 is a sectional view of the cartridge in FIG. 36, in which the first optical disc of the standard size is held in the first disc holder.
Figure 41:
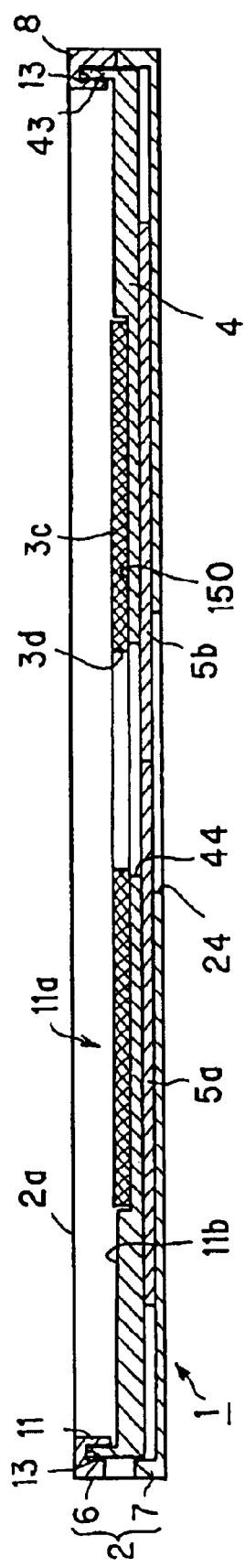
FIG. 41 is a sectional view of the cartridge in FIG. 36, in which the second optical disc smaller in diameter than the first optical disc is held in the second disc holder.

As shown in FIGS. 40 and 41, the cartridge 140 including the above inner rotor 4 has defined in the cartridge body 2 the disc receptacle 11a which receives, through the insertion/removal opening 2a in the upper shell 6, the first optical disc 3a of the standard size or the second optical disc 3c whose diameter is smaller than that of the first optical disc 3a. The disc receptacle 11a has formed therein the first disc holder 11b to hold the first optical disc 3a and the second disc holder 150 to hold the second optical disc 3c, the first and second disc holders 11b and 150 being concentrical with each other. The first disc holder 11b is defined by the main side of the inner rotor 4 except for the openings 44 and 44a and the opening wall 11, while the second disc holder 150 is defined by the concavity formed in the inner rotor 4 at the side of the upper shell 6.

As shown in FIG. 40, the first optical disc 3a received in the disc receptacle 11a through the insertion/removal opening 2a will be rotatably held in the first disc holder 11b defined by the main side of the inner rotor 4 in which the opening 44a is formed and the opening wall 11. More particularly, the first disc holder 11b supports the first optical disc 3a on the main side of the inner rotor 4 in which the opening 44a is formed and holds it by the opening wall 11 not to sway horizontally.

As shown in FIG. 41, the second optical disc 3c received in the disc receptacle 11a through the insertion/removal opening 2a will be rotatably held in the second disc holder 150 defined by the concavity formed in the main side of the inner rotor 4. More particularly, the second disc holder 150 supports the second optical disc 3c on the bottom thereof and holds it by the wall thereof not to sway horizontally.

Note that the inner rotor 4 may have provided around the concavity defining the second disc holder 150 the come-off preventive mechanisms 91 as shown in FIGS. 26 to 28 or the ones 101 shown in FIGS. 29 to 31 to prevent the second optical disc 3c held in the second disc holder 150 from coming off. In case there are provided the cover 116 and locking mechanism 121 shown in FIGS. 32 to 35, it is possible to prevent the first optical disc 3a held in the first disc holder 11b from coming off and the second optical disc 3c held in the second disc holder 150 from coming off.

According to the present invention, the inner rotor 4 may be used in the aforementioned cartridge 140.

The aforementioned cartridges 1 and 140 are designed to have selectively held therein the first and second optical discs 3a and 3c different in diameter from each other. However, the cartridge according to the present invention may be adapted to encase only the second optical disc 3c of the small diameter.

According to the present invention, there can be provided a cartridge for encasing only the second optical disc 3c and loadable into the aforementioned recorder/player 70 as will be described herebelow. The cartridge of this type is generally indicated with a reference 200. The same or similar elements of the cartridge 200 as or to those of the aforementioned cartridges 1 and 140 will be indicated with the same or similar references, and will not be explained in detail. The cartridge 200 uses only the second disc holder 11c formed within the disc receptacle 11a defined by the opening wall 11 of the cartridge body 2 and the main side of the inner rotor 4. That is, this second disc holder 11c is defined by the opening 44a formed in the main side of the rotor 4 and the shutter members 5a and 5b disposed to cover the opening 44a. The cartridge 200 is not intended to use the first disc holder 11b to hold any optical disc, and so it can be used for any other purpose than holding the optical disc. For example, a come-off preventive mechanism to prevent the second optical disc 3c held in the second disc holder 11c from coming off may be provided around the opening 44a of the inner rotor 4.

The cartridge 200 encasing the second optical disc 3c and permitting to load the disc 3c into the recorder/player 70 will be described herebelow:

The cartridge 200 intended primarily for encasing the second optical disc 3c is basically similar to the cartridge 1 for selectively encasing the aforementioned first and second optical discs 3a and 3c. So, the same or similar elements of the cartridge 200 as or to those of the cartridge 1 will be indicated with the same or similar references and will not be explained in detail.

The cartridge 200 is provided with come-off preventive mechanisms 191 to prevent the small-diameter second optical disc 3c held in the second disc holder 11c from coming off.

Figure 42:
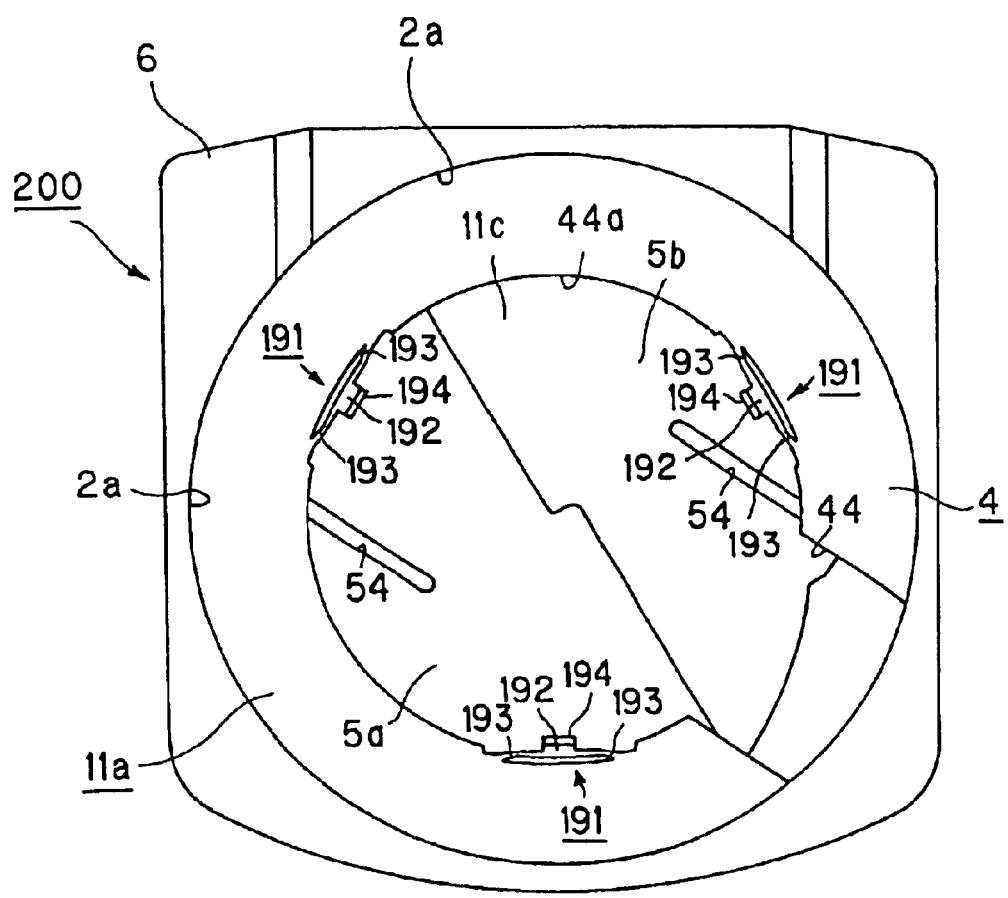
FIG. 42 is a plan view of the cartridge in FIG. 36 with the optical disc come-off preventive mechanisms provided around of the second disc holder.
Figure 43:
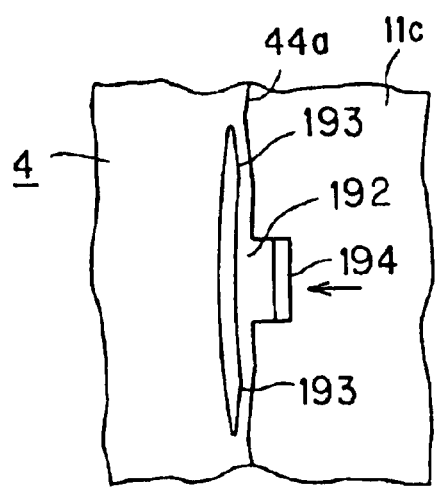
FIG. 43 is a segmentary plan view of the come-off preventive mechanism.

The come-off preventive mechanisms 191 are provided around the opening 44a in the inner rotor 4 that defines the second disc holder 11b as shown in FIG. 42. The come-off preventive mechanism 191 is provided in three places around the insertion/removal opening 2a. Each of the come-off preventive mechanisms 191 is formed integrally with the main side of the inner rotor 4 as shown in FIG. 43, which is intended against any increased number of parts. Each of the come-off preventive mechanisms 191 includes a come-off preventive piece 192 to prevent the second optical disc 3c held in the second disc holder 11c from coming off, and elastically flexible pieces 193 to couple the come-off preventive piece 192 and main side of the inner rotor 4 with each other. The come-off preventive piece 192 is provided to project toward the insertion/removal opening 2a to catch the perimeter of the second optical disc 3c held in the second disc holder 11c. The end top of the come-off preventive piece 192 is tapered, and an insertion guide 194 is provided on the tapered end top to guide the second optical disc 3c being inserted into the second disc holder 11c. Across the come-off preventive piece 192, there are provided the elastically flexible pieces 193 which couple the come-off preventive piece 192 to the main side of the inner rotor 4. When the second optical disc 3c is inserted, the elastically flexible pieces 193 are moved outwardly of the second disc holder 11c while the come-off preventive piece 192 is moved outwardly of the opening 44a, so that the second optical disc 3c can be inserted into the opening 44a.

Figure 44:
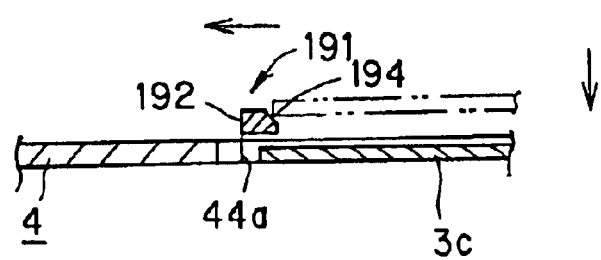
FIG. 44 is a segmentary sectional view of the come-off preventive mechanism.

When the insertion guide 194 is pressed by the perimeter of the second optical disc 3c being inserted, the elastically flexible pieces 193 are moved and the come-off preventive piece 192 is provisionally moved outwardly of the second disc holder 11c against the elasticity of the elastically flexible pieces 193, as shown in FIG. 44. Thus, the second optical disc 3c will be held in the second disc holder 11c.

Note that the second optical disc 3c will possibly have the signal recording surface thereof stained and/or damaged if it is repeatedly inserted into, and removed from, the cartridge 200. To prevent the optical disc from being stained and/or damaged at the signal recording surface thereof due to such repeated insertion and removal, the second optical disc 3c once received in the second disc holder 11c should desirably be not easily removable from the cartridge 200. To this end, the come-off preventive mechanism 191 to prevent at least the second optical disc 3c from coming off is constructed as follows. Namely, its end top is tapered as the insertion guide 194 and its surface for catching the second optical disc 3c is made flat in parallel to the second optical disc 3c, so that once the second optical disc 3c is received in the second disc holder 11c of the disc receptacle 11a, the come-off preventive piece 192 will not easily be movable toward the perimeter of the second disc holder 11c against the elasticity of the elastically flexible pieces 193 and thus the second optical disc 3c cannot easily be taken out of the second disc holder 11c.

Note that in the foregoing, the present invention has been explained concerning an variant thereof provided with the three come-off preventive mechanisms 191 but the come-off preventive mechanism 191 may be provided in one place, or in the plurality of places to prevent the second optical disc 3c more positively from coming off.

Figure 45:
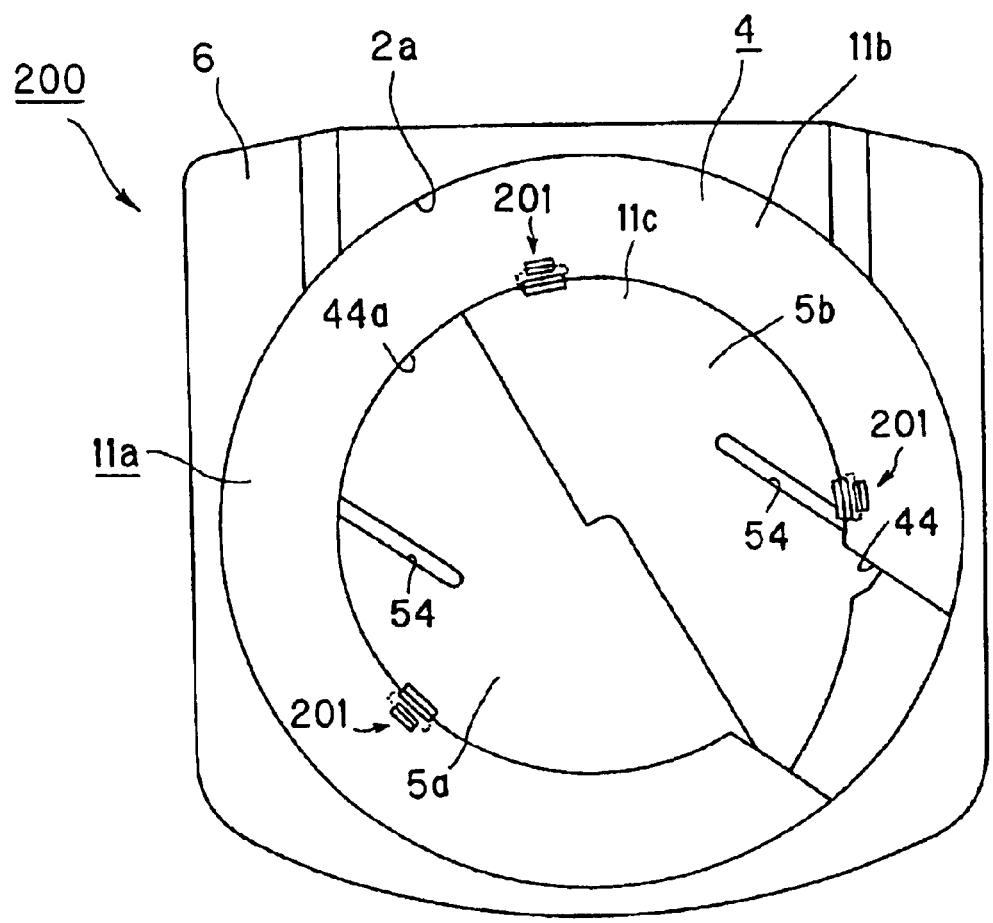
FIG. 45 is a plan view of the cartridge with the optical disc come-off preventive mechanisms provided around the second disc holder.
Figure 46:
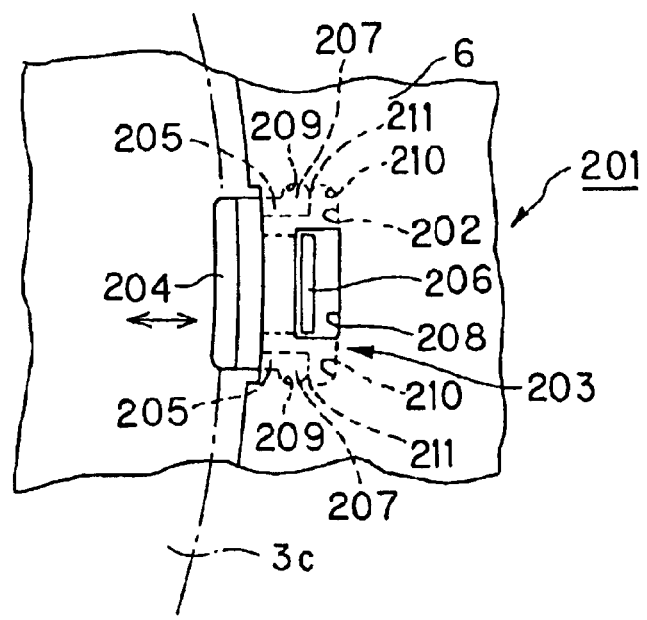
FIG. 46 is a segmentary plan view of the come-off preventive mechanism.
Figure 47:
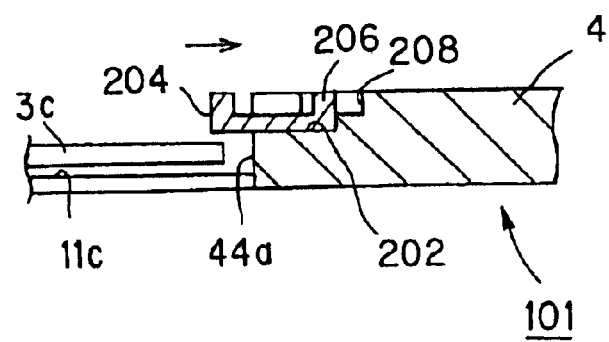
FIG. 47 is a segmentary sectional view of the come-off preventive mechanism.

The come-off preventive mechanism for the second optical disc 3c received in the second disc holder 11c may be adapted as shown in FIGS. 45 to 47. As shown, the come-off preventive mechanism generally indicated with a reference 201 is provided in three places around the second disc holder 11c. Each of the come-off preventive mechanisms 201 includes a receiver 202 formed in the wall of the opening 44a and a come-off preventive member 203 received in the receiver 202.

The come-off preventive member 203 is composed of a come-off preventive piece 204 to catch the perimeter of the second optical disc 3c held in the second disc holder 11c and thus prevent the second optical disc 3c from coming off the second disc holder 11c, elastically flexible pieces 205 to limit the movement of the come-off preventive member 203, and an operating piece 206 to operate the come-off preventive member 203. The elastically flexible pieces 205 are formed to elastically move inwardly, and each of them has an engagement portion 207 provided on the free end thereof.

The receiver 202 to receive the come-off preventive member 203 is formed to such a size that the come-off preventive piece 204 projects toward the second disc holder 11c and can be moved between a come-off preventive position in which it catches the perimeter of the second optical disc 3c held in the second disc holder 11c and a disc insertion/removal position where the come-off preventive piece 204 retreats from the second disc holder 11c and the second optical disc 3c can be inserted or removed. The come-off preventive member 203 received in the receiver 202 has the operating piece 206 thereof exposed to outside through an access hole 208 formed in the main side of the inner rotor 4. The engagement portion 207 of each elastically flexible piece 205 is selectively engaged in either a first engagement concavity 209 or second engagement concavity 210 formed in the receiver 202. Between the first and second engagement concavities 209 and 210, there is provided a projection 211 which clicks when overridden by the engagement portion 207.

In the come-off preventive mechanism 201, when the second optical disc 3c is inserted into, or removed from, the cartridge 200, the operating piece 206 exposed to outside through the access hole 208 is moved toward the wall of the second disc holder 11c for engagement of the engagement portion 207 into the second engagement concavity 210. Thus, the come-off preventive member 203 is held in the insertion/removal position where the come-off preventive piece 204 has retreated from the second disc holder 11c and the optical disc 3c can be inserted or removed. Namely, the second optical disc 3c can be inserted into, or removed from, the cartridge 200. Once the second optical disc 3c is inserted into the second disc holder 11c, when the operating piece 206 exposed to outside through the access hole 208 is moved toward the insertion/removal opening 2a, the engagement portion 207 moves from the second engagement concavity 210 to the first engagement concavity 209. When overriding the projection 211, the engagement portion 207 will click. When the engagement portion 207 is engaged in the first engagement concavity 209, the come-off preventive member 203 is held in the come-off preventive position where the come-off preventive piece 204 projects toward the second disc holder 11c. In case the come-off preventive mechanism 201 is provided in a plurality of places so that even if one of the come-off preventive members 203 is moved erroneously to the disc insertion/removal position, the other come-off preventive members 203 will stay in their respective come-off preventive positions, it is possible to prevent the second optical disc 3c from erroneously coming off the second disc holder 11c.

The cartridge 200 may also have provided on the cartridge body 2 thereof a cover which covers the disc insertion/removal opening 2a to prevent the second optical disc 3c held in the second disc holder 11c from coming off.

The present invention has been described concerning the cartridge embodiments each for encasing an optical disc.

However, the present invention is not limited to the aforementioned optical disc but can be applied widely to cartridges which permit to load any other bare information recording medium, namely, an information recording medium normally used, not encased in any cartridge or the like, into a recorder and/or player dedicated for use with a disc cartridge.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

INDUSTRIAL APPLICABILITY

According to the present invention, the cartridge has an insertion/removal opening formed in the main side of the upper shell, through which first and second recording medium of different diameters can be freely inserter into, or removed from, the cartridge body, the first recording medium holder in which the first recording medium is to be held and the second recording medium holder in which the second recording medium is to be held. The cartridge having the first recording medium held in the first recording medium holder or second recording medium held in the second recording medium holder can be loaded into the recorder and/or player to write information signal to the first or second recording medium and also read information signal from the first or second recording medium. Since in the cartridge according to the present invention, the structure including the shutter members etc. is common to a recording-medium cartridge (having a recording medium pre-encased therein), the cartridge can be loaded into a recorder and/or player dedicated for use with such a recording-medium cartridge. Further, the cartridge according to the present invention has the generally same construction as that of the recording medium cartridge of which the recording medium once encased therein is not replaceable with another, it can easily be manufactured using the same assembling line for the recording-medium cartridge.

What is claimed is:

1. A cartridge for encasing either of a first recording medium and a second recording medium different in diameter from the first recording medium, the cartridge comprising:

a cartridge body consisting of an upper shell and lower shell, butted to each other, the upper shell having formed in the main side thereof an insertion/removal opening having a diameter larger than the first recording medium and through which the first and second recording media are to be inserted and/or removed and the lower shell having a first opening formed therein;

a middle shell having the main side thereof exposed to outside through the insertion/removal opening in the upper shell of the cartridge body, defining together with the insertion/removal opening a recording medium receptacle which selectively receives the first and second recording media, having formed therein a second opening corresponding to the first opening in the lower shell of the cartridge body and which is rotatably received in the cartridge body; and a pair of shutter members installed to the middle shell at the side of the lower shell side and which uncovers the first and second openings when the middle shell rotates until the first and second openings are aligned with each other;

the recording medium receptacle including a first recording medium holder in which the first recording medium is rotatably held and a second recording medium holder in which the second recording medium is rotatably held, the first and second recording medium holders being provided concentrically with each other.

2. The cartridge as set forth in claim 1, wherein the first recording medium holder is formed in the main side of the middle shell; and the second recording medium holder is formed in a position lower than the first recording medium holder.

3. The cartridge as set forth in claim 2, wherein the second recording medium holder is defined by a third opening having a larger diameter than the second recording medium and through which the shutter members provided over the main side of the middle shell are exposed to outside.

4. The cartridge as set forth in claim 2, wherein the second recording medium holder is defined by a concavity formed in the main side of the middle shell, having a somewhat larger diameter than the second recording medium and of which the depth is smaller than its surrounding.

5. The cartridge as set forth in claim 1, wherein come-off preventive mechanisms are provided around the insertion/removal opening in the upper shell to prevent the first recording medium held in the first recording medium holder from coming off;

each of the come-off preventive mechanisms being composed of an insertion guide to guide the first recording medium being inserted into the first recording medium holder, and a come-off preventive piece to prevent the first recording medium held in the first recording medium from coming off, the come-off preventive piece being formed integrally on contact with elastically flexible pieces which are elastically moved radially of the recording medium receptacle.

6. The cartridge as set forth in claim 5, wherein the come-off preventive mechanism is provided in a plurality of places around the insertion/removal opening.

7. The cartridge as set forth in claim 1, wherein come-off preventive mechanisms are provided around the insertion/removal opening in the upper shell to prevent the first recording medium held in the first recording medium holder from coming off;

the come-off preventive mechanism including a come-off preventive member to prevent the first recording medium held in the first recording medium holder from coming off, the come-off preventive member being received in a receiver formed in the wall of the insertion/removal opening in the upper shell;

the come-off preventive member including a come-off preventive piece to prevent the first recording medium held in the first recording medium holder from coming off, elastically flexible pieces each having an engagement portion formed at one end thereof, and an operating piece to move the come-off preventive piece between a come-off preventive position where the come-off preventive mechanism is to prevent the first recording medium held in the first recording medium from coming off and an access position in which the first recording medium is to be inserted and/or removed; and the receiver including a first engagement concavity in which the engagement portion is engaged when the come-off preventive member is held in the come-off preventive position, and a second engagement concavity in which the engagement portion is engaged when the come-off preventive member is held in the access position.

8. The cartridge as set forth in claim 7, wherein the come-off preventive mechanism is provided in a plurality of places around the insertion/removal opening in the upper shell.

9. The cartridge as set forth in claim 1, wherein the cartridge body is provided with a cover which covers and uncovers the insertion/removal opening.

10. The cartridge as set forth in claim 9, further comprising a locking mechanism to lock the cover in a position where the cover is to cover the insertion/removal opening;

the locking mechanism having a cover operating member disposed in the receiver formed in the wall of the insertion/removal opening in the upper shell;

the cover operating member including a first elastically flexible piece having provided at an end thereof a locking portion which is engaged on the engagement piece on the cover, a second elastically flexible piece having an engagement portion provided at an end thereof, and an operating portion which moves the cover operating member between a locking position in which the locking portion is engaged on the engagement piece and an unlocking position in which the locking portion is not engaged on the engagement piece; and the receiver including a first engagement concavity in which the engagement portion is engaged when the cover operating member is held in the locking position, and a second engagement concavity in which the engagement portion is engaged when the cover operating member is held in the unlocking position.

11. The cartridge as set forth in claim 10, wherein the locking mechanism is provided in a plurality of places around the insertion/removal opening.

12. A cartridge for a recording medium smaller in diameter than a recording medium of a standard size, the cartridge comprising:

a cartridge body consisting of an upper shell and lower shell, butted to each other, the upper shell having formed in the main side thereof an insertion/removal opening through which a small-diameter recording medium larger than at least the small-diameter recording medium is inserted and/or removed and the lower shell having a first opening formed therein;

a middle shell having the main side thereof exposed to outside through the insertion/removal opening in the upper shell, having a second opening formed in the main side thereof correspondingly to the first opening in the lower shell and which is rotatably received in the cartridge body; and a pair of shutter members installed to the middle shell at the side of the lower shell side and which uncovers the first and second openings when the middle shell rotates until the first and second openings are aligned with each other;

there being formed in the main side of the middle shell a recording medium holder in which a small-diameter recording medium is rotatably held.

13. The cartridge as set forth in claim 12, wherein the recording medium holder is defined by a third opening through which the shutter members provided on the main side of the middle shell are exposed to outside.

14. The cartridge as set forth in claim 12, wherein the recording medium holder is defined by a concavity formed in the main side of the middle shell and having a somewhat larger diameter than the small-diameter recording medium.

15. The cartridge as set forth in claim 12, wherein: come-off preventive mechanisms are provided around the insertion/removal opening to prevent the small-diameter recording medium held in the recording medium holder from coming off;

each of the come-off preventive mechanisms being composed of an insertion guide to guide the small-diameter recording medium being inserted into the recording medium holder, and a come-off preventive piece to prevent the small-diameter recording medium held in the recording medium from coming off, the come-off preventive piece being provided on contact with elastically flexible pieces which are elastically moved radially of the recording medium receptacle.

16. The cartridge as set forth in claim 15, wherein the come-off preventive mechanism is provided in a plurality of places around the insertion/removal opening.

17. The cartridge as set forth in claim 12, wherein come-off preventive mechanisms are provided around the recording medium receptacle to prevent the small-diameter recording medium held in the recording medium holder from coming off;

the come-off preventive mechanism including a come-off preventive member disposed in the middle shell to prevent the small-diameter recording medium held in the recording medium holder from coming off;

the come-off preventive member including a come-off preventive piece to prevent the small-diameter recording medium held in the recording medium holder from coming off, elastically flexible pieces each having an engagement portion formed at one end thereof, and an operating piece to move the come-off preventive piece between a come-off preventive position in which the small-diameter recording medium held in the recording medium is prevented from coming off and an access position in which the small-diameter recording medium is allowed to be inserted and/or removed; and the engagement portion being engaged into a first engagement concavity formed in the middle shell when the come-off preventive member is held in the come-off preventive position, and in a second engagement concavity formed also in the middle shell when the come-off preventive member is held in the access position.

18. The cartridge as set forth in claim 17, wherein the come-off preventive mechanism is provided in a plurality of places around the recording medium holder.

19. The cartridge as set forth in claim 12, wherein the cartridge body is provided with a cover which covers and uncovers the insertion/removal opening.

20. The cartridge as set forth in claim 19, further comprising a locking mechanism to lock the cover in a position where the cover covers the insertion/removal opening;

the locking mechanism having a cover operating member disposed in a receiver formed in the wall of the insertion/removal opening in the upper shell;

the cover operating member including a first elastically flexible piece having provided at an end thereof a locking portion which is engaged on the engagement piece on the cover, a second elastically flexible piece having an engagement portion provided at an end thereof, and an operating portion which moves the cover operating member between a locking position in which the locking portion is engaged on the engagement piece and an unlocking position in which the locking portion is not engaged on the engagement piece; and the receiver including a first engagement concavity in which the engagement portion is engaged when the cover operating member is held in the locking position, and a second engagement concavity in which the engagement portion is engaged when the cover operating member is held in the unlocking position.

21. The cartridge as set forth in claim 20, wherein the locking mechanism is provided in a plurality of places around the insertion/removal opening in the upper shell.

* * * * *